US009095978B2

(12) United States Patent
Shi et al.

(10) Patent No.: US 9,095,978 B2
(45) Date of Patent: Aug. 4, 2015

(54) PLANNING A GRASP APPROACH, POSITION, AND PRE-GRASP POSE FOR A ROBOTIC GRASPER BASED ON OBJECT, GRASPER, AND ENVIRONMENTAL CONSTRAINT DATA

(71) Applicant: GM GLOBAL TECHNOLOGY OPERATIONS LLC, Detroit, MI (US)

(72) Inventors: Jianying Shi, Oakland Township, MI (US); Gurdayal Singh Koonjul, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 14/099,095

(22) Filed: Dec. 6, 2013

(65) Prior Publication Data

US 2014/0163731 A1 Jun. 12, 2014

Related U.S. Application Data

(60) Provisional application No. 61/734,761, filed on Dec. 7, 2012.

(51) Int. Cl.
*B25J 9/16* (2006.01)
*B25J 9/00* (2006.01)
*B25J 15/00* (2006.01)

(52) U.S. Cl.
CPC .............. *B25J 9/1669* (2013.01); *B25J 9/0096* (2013.01); *B25J 9/1612* (2013.01); *B25J 9/1633* (2013.01); *B25J 9/1664* (2013.01); *B25J 15/0009* (2013.01); *G05B 2219/39322* (2013.01);

(Continued)

(58) Field of Classification Search
CPC .... B25J 9/1612; B25J 15/0009; B25J 9/1633; B25J 9/1669; B25J 13/081; B25J 9/0096; B25J 9/1664; G05B 2219/39322; G05B 2219/39484; G05B 2219/39536; G05B 2219/39543; G05B 2219/40122
USPC .......... 700/250, 251, 253, 254, 260; 901/2, 9, 901/30, 32
See application file for complete search history.

(56) References Cited

U.S. PATENT DOCUMENTS 8,335,591 B2 * 12/2012 Takahashi ..................... 700/260
8,346,393 B2 * 1/2013 Kim et al. ..................... 700/261
8,355,816 B2 * 1/2013 Saito ............................ 700/253

(Continued)

*Primary Examiner* — Jason Holloway
(74) *Attorney, Agent, or Firm* — Mickki D. Murray; Parks Wood LLC

(57) ABSTRACT

A system including a memory having instructions causing a processor to perform operations, for planning a grasping-device approach to an object by a grasping device, a pre-grasp device position, and a pre-grasp device pose. The operations comprise obtaining input data including grasping-device data, object data, and environmental-constraint data, determining, based on the grasping-device data, a grasp volume model, determining a test approach vector, and determining, using the vector, the constraint data, and the model, whether approach vector modification is needed. The operations also include modifying, if modification is needed, the test approach, yielding a resulting approach vector, and determining, if modification is not needed, that the test approach is the resulting approach vector. And the operations include determining a virtual floor indicating a position below which the grasping device cannot move, and determining, based on the resulting vector, virtual floor, model, and object data, the device approach, position, and pose.

20 Claims, 15 Drawing Sheets

(52) U.S. Cl.
CPC ............... *G05B2219/39536* (2013.01); *G05B 2219/39543* (2013.01)

(56) References Cited

U.S. PATENT DOCUMENTS

| | | | |
|---|---|---|---|
| 8,725,296 B2* | 5/2014 | Nagasaka et al. | 700/263 |
| 8,935,004 B2* | 1/2015 | Iida | 700/250 |
| 2009/0069942 A1* | 3/2009 | Takahashi | 700/260 |
| 2011/0035053 A1* | 2/2011 | Guochunxu et al. | 700/255 |
| 2012/0048027 A1* | 3/2012 | Hashiguchi et al. | 73/763 |
| 2012/0186383 A1* | 7/2012 | Schvalb et al. | 74/490.04 |
| 2013/0138244 A1* | 5/2013 | Nagasaka et al. | 700/245 |
| 2013/0184870 A1* | 7/2013 | Ota et al. | 700/262 |

* cited by examiner

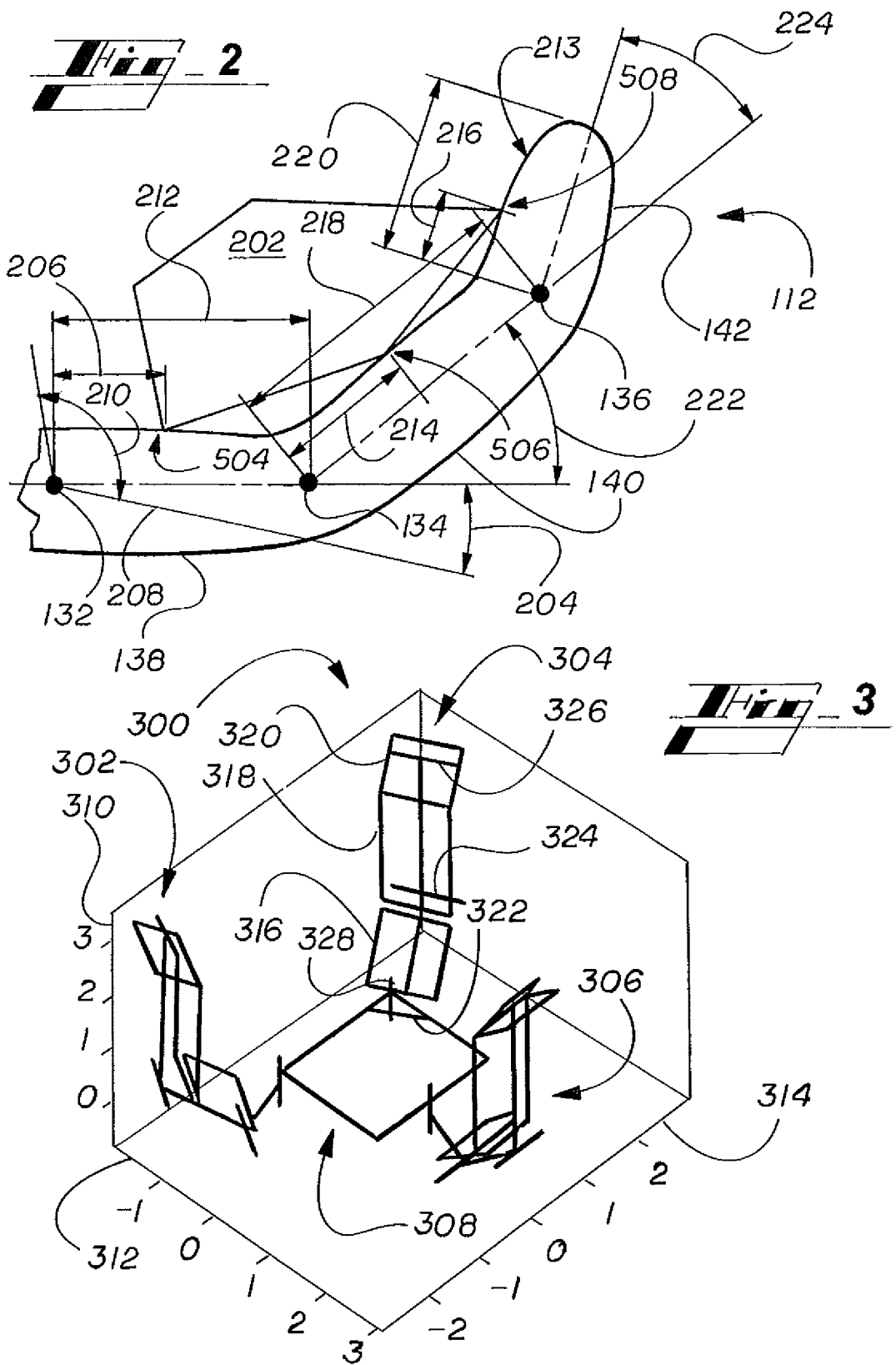

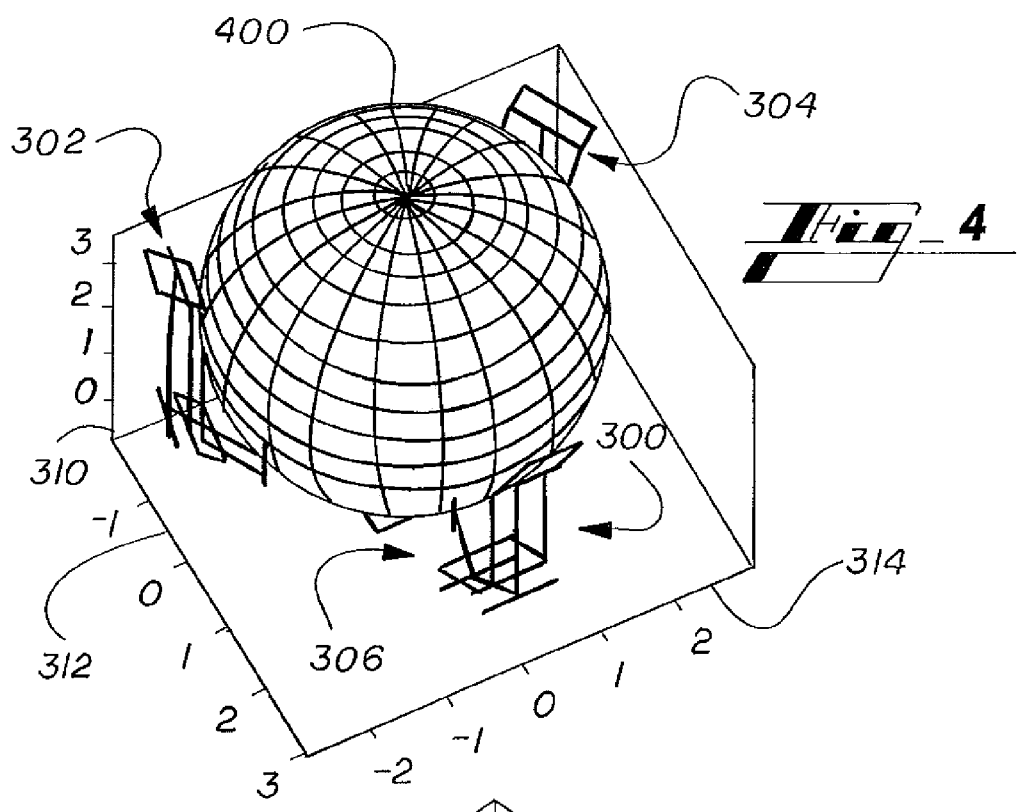
Fig_4
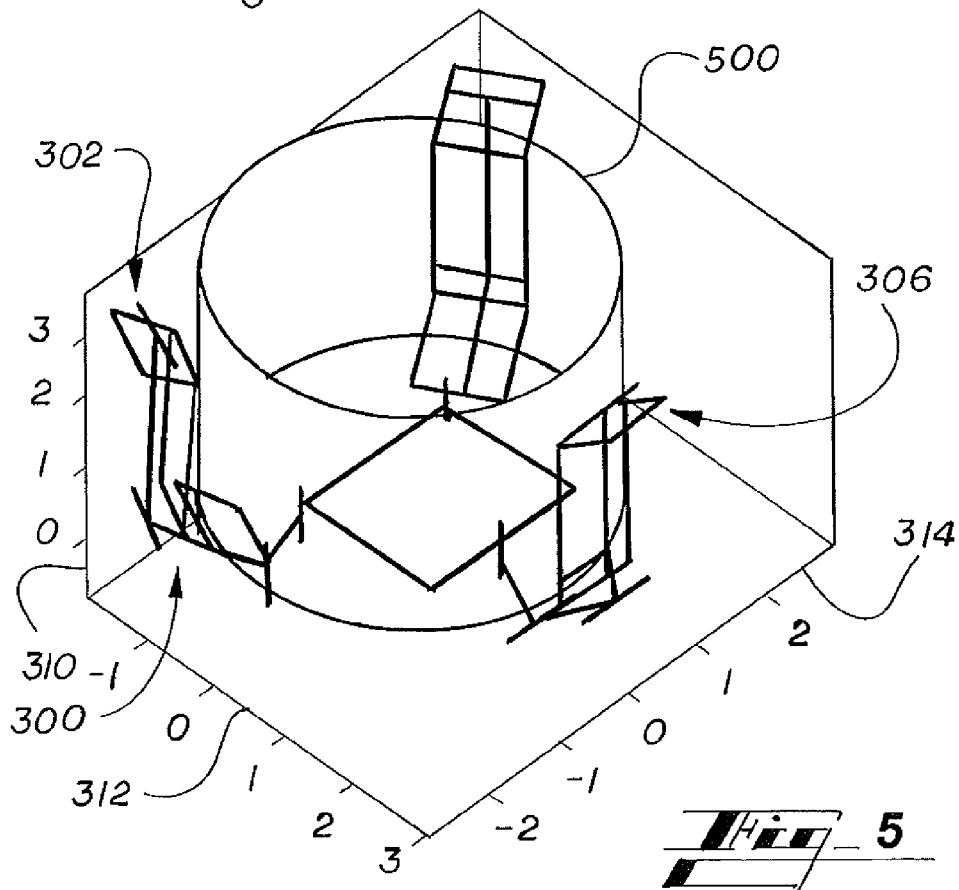
Fig_5

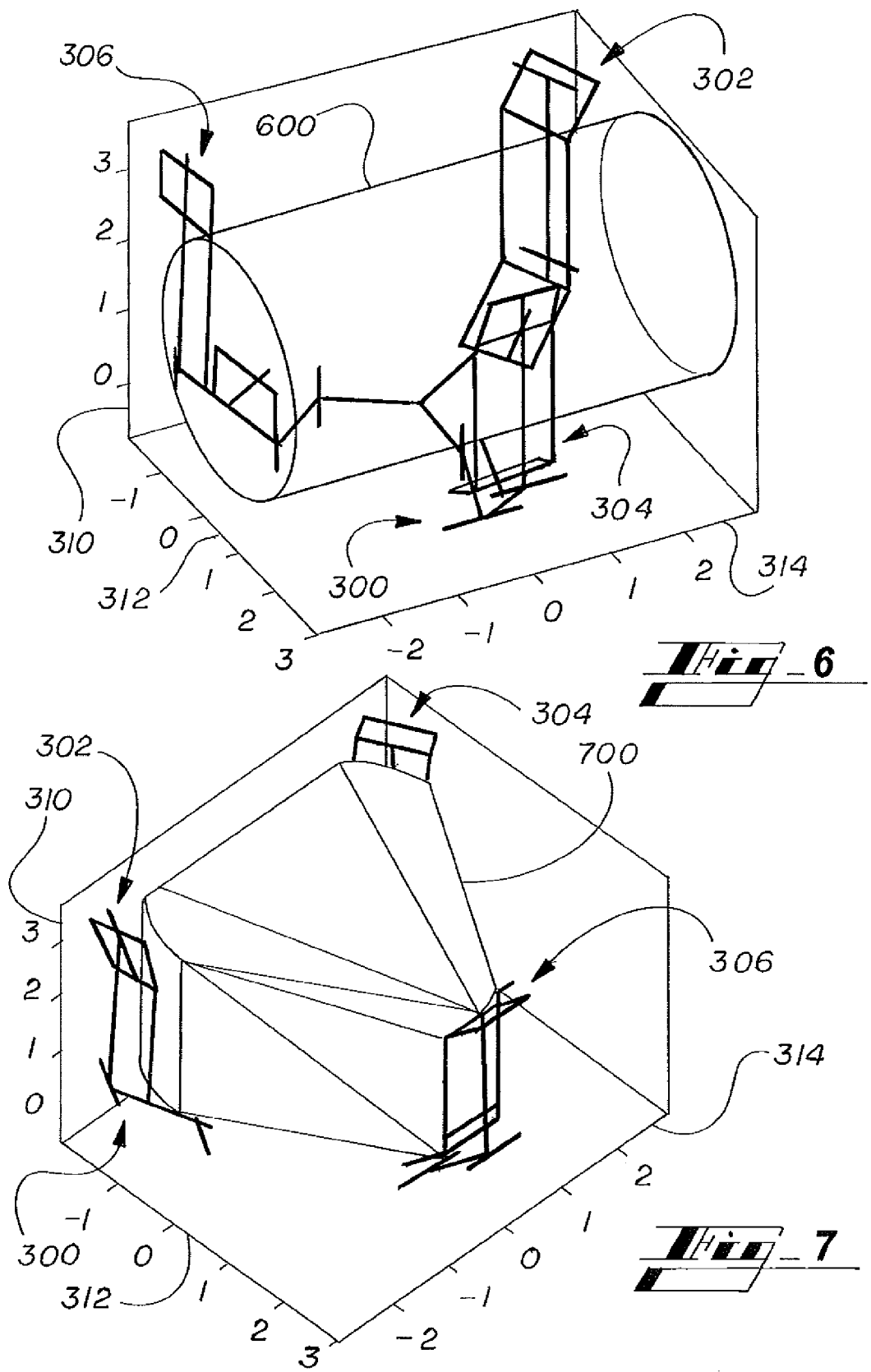

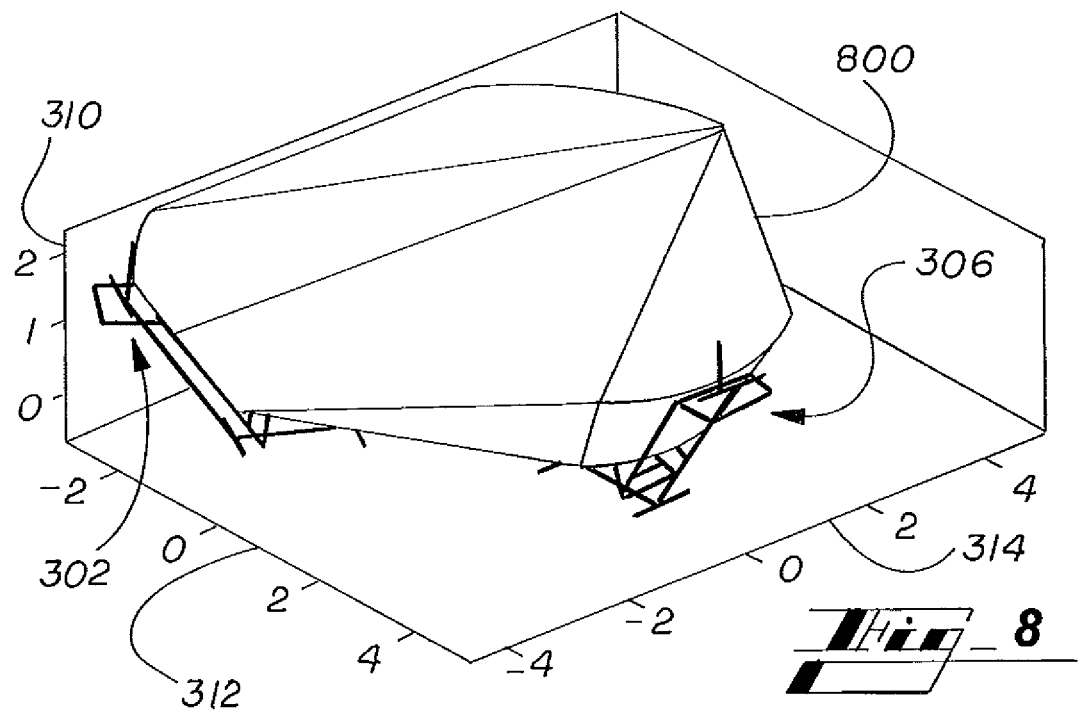
_Fig._ 8
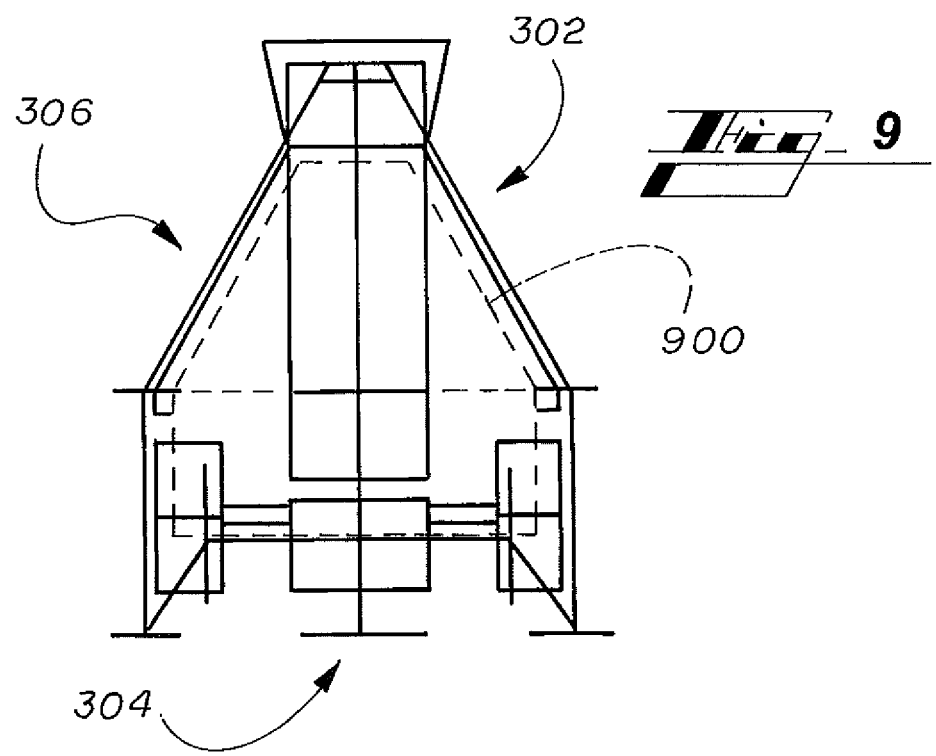
_Fig._ 9

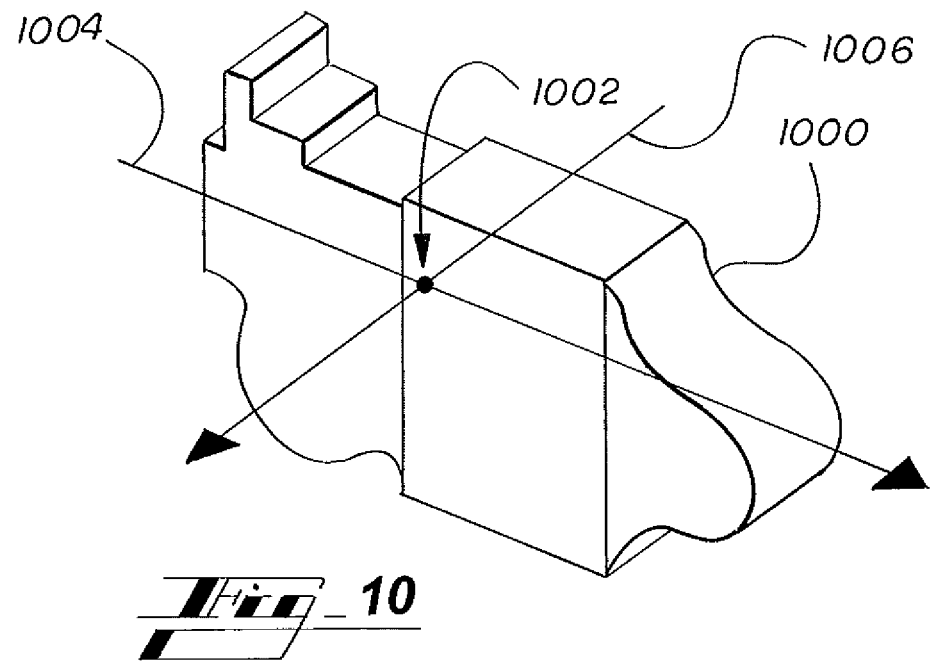
Fig_10
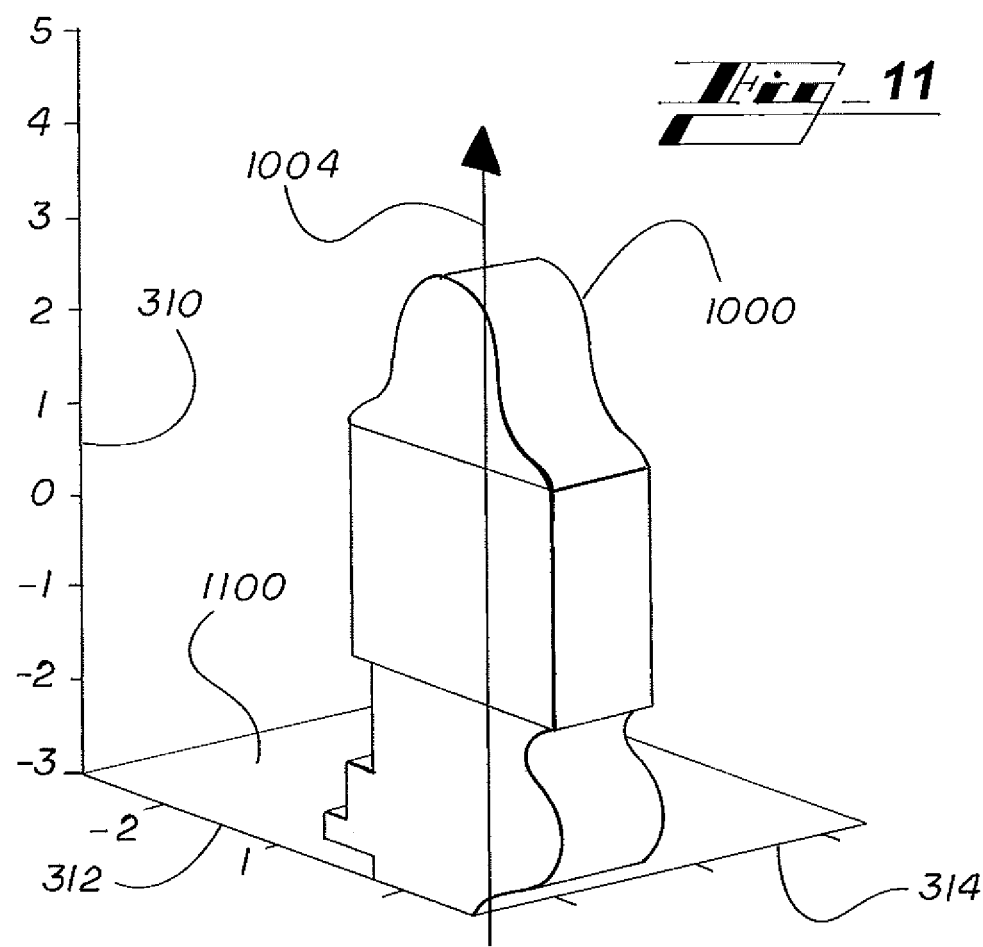
Fig_11

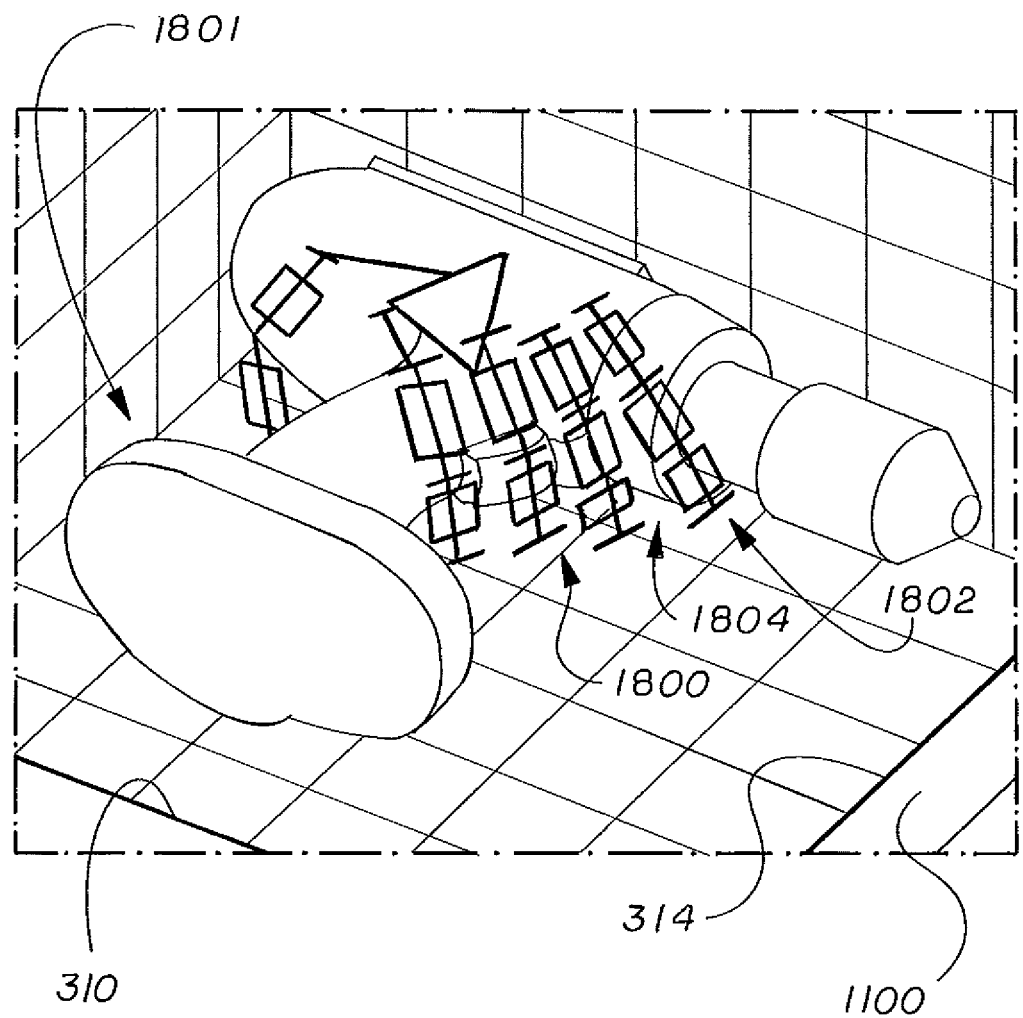

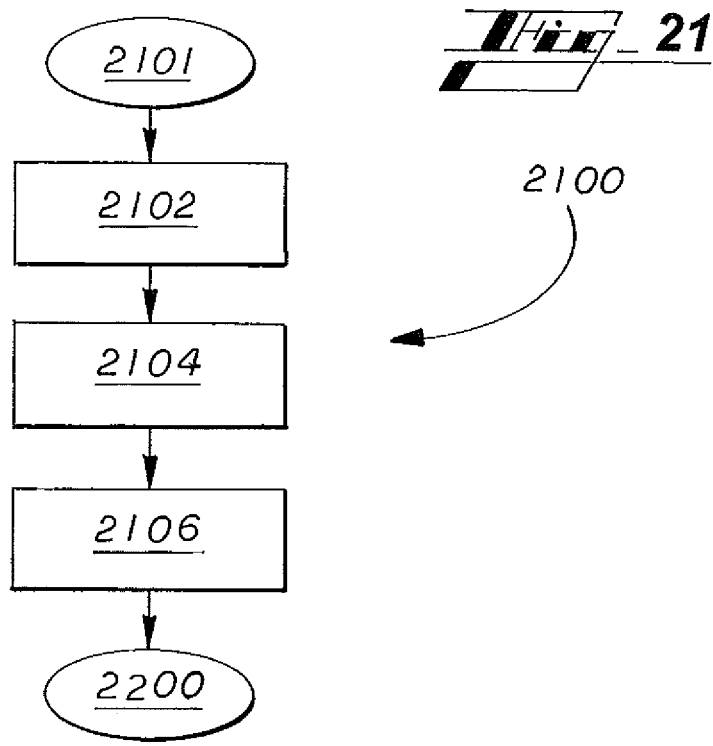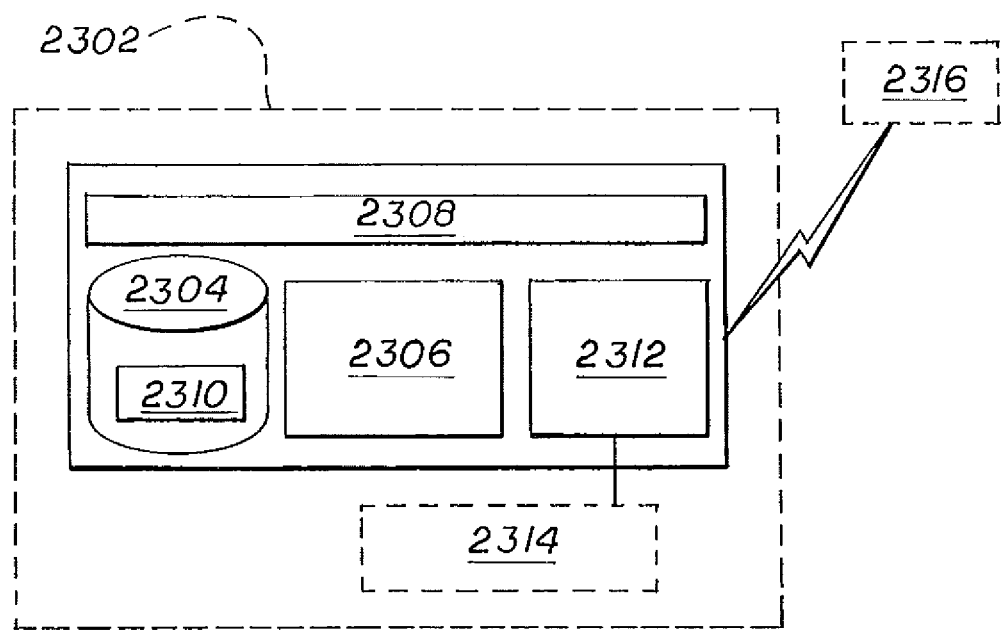

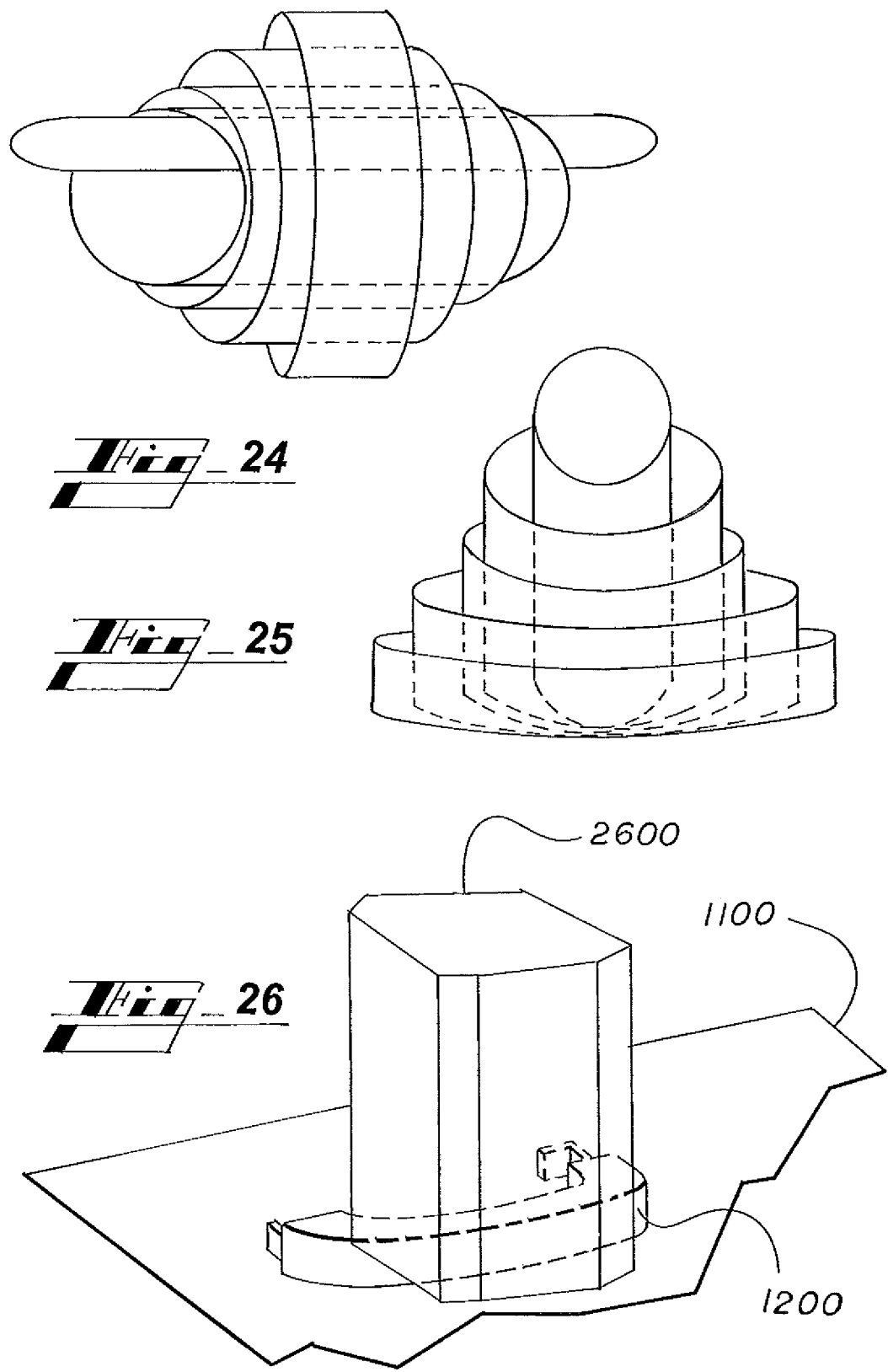
Fig_24
Fig_25
Fig_26

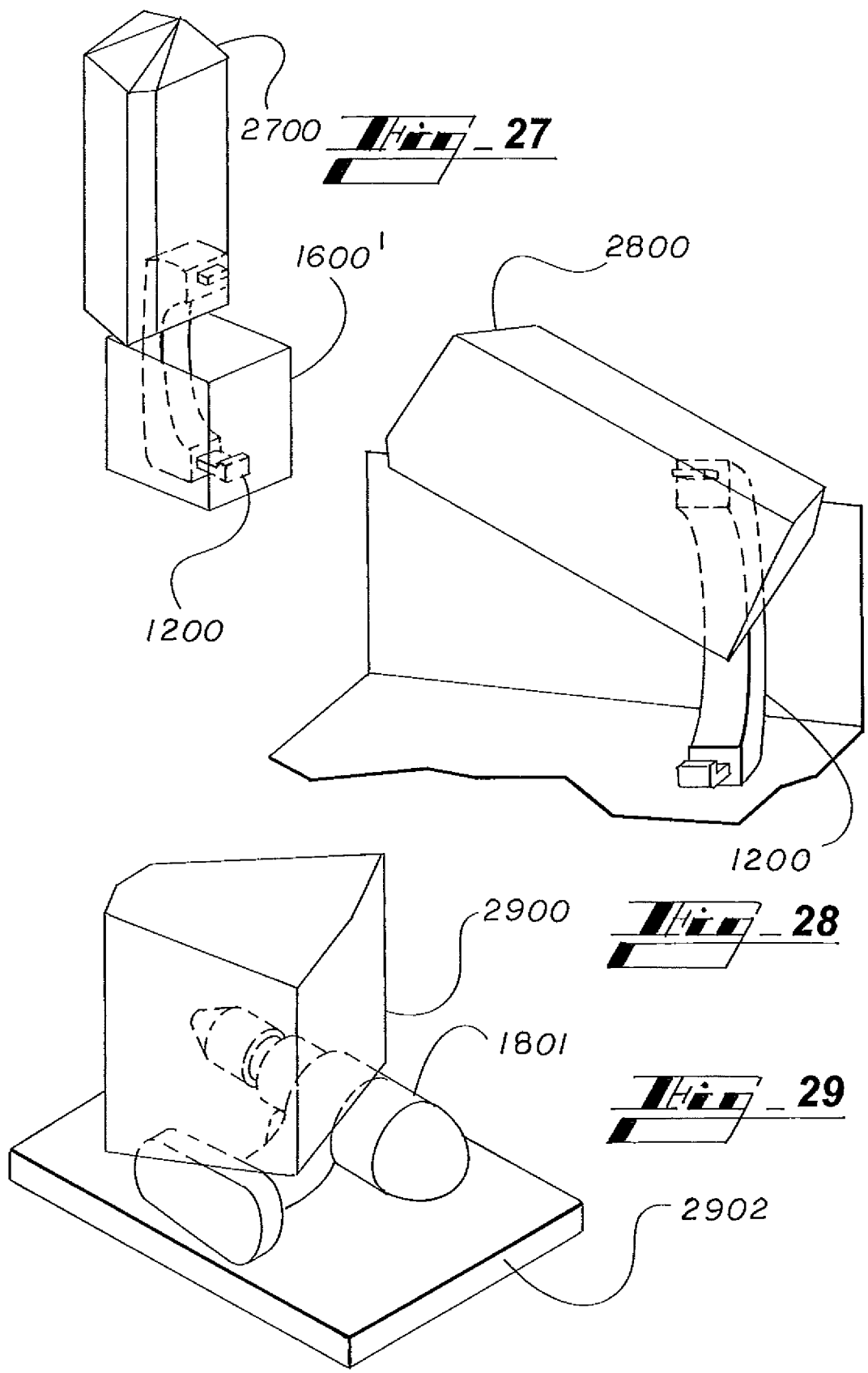

PLANNING A GRASP APPROACH, POSITION, AND PRE-GRASP POSE FOR A ROBOTIC GRASPER BASED ON OBJECT, GRASPER, AND ENVIRONMENTAL CONSTRAINT DATA

TECHNICAL FIELD

The present disclosure relates generally to planning a grasp approach, position, and pre-grasp pose for use by a robotic grasper (or robotic hand, or gripper, etc.) in real-time and, more particularly, to systems, computer-readable storage devices, and methods for real-time planning the grasp approach, position, and pre-grasp pose based on object data, grasper data, and data describing any environmental constraints, such as such as tables, boxes, walls, and other objects or parts adjacent the object.

BACKGROUND

There is a need for a computerized system configured to plan a grasp approach, position, and pre-grasp pose for implementation by a robotic hand. The system would facilitate grasping of three-dimensional objects (e.g., complex three-dimensional objects) in a speedy, feasible, and reliable manner.

Such a computerized solution does not exist, and manual training efforts toward the goal are too tedious and consumptive in terms of time and processing resources for use in real-time applications such as on a manufacturing assembly line.

One iterative manual method for arranging a grasp position and a grasp configuration consists of (1) manually moving the robot hand to near the object, (2) positioning the fingers around the object for a desired grasp, (3) using a command program to initiate closure of the fingers around the object, (4) checking to see if the object is securely held by manually attempting to shaking the object out of the robot grasp, (5) making a mental judgment of whether other robot finger positions would be better, and, if so, (6) repeating above steps until the operator is satisfied with the grasp.

Some conventional systems generate an approach based simply on feedback from real-time vision systems and/or touch sensors. Some conventional methods, such as attempting to grasp an object based only on feedback from a camera and/or one or more on-robot touch sensors, require human, manual, interaction to control or teach the robot hand. All are too computationally expensive and time consuming for performing efficiently in real-time applications.

SUMMARY

The present disclosure describes algorithm-based systems and methods for intelligently planning a grasp approach, position, and pre-grasp pose for implementation by a grasping device for use to grasp a three-dimensional object, e.g., complex three-dimensional object.

For speed, algorithms based more on analytics are preferred over more-iterative processes such as basically numerical iterative solutions. Fast implementation allows real-time use in time-sensitive environments, such as on an assembly line of a manufacturing plant.

Related foci of the solution are feasibility and efficiency. The planning algorithm exploits kinematic characteristics of the particular robot hand being used, such as size, degrees of freedom, and strength or energy features, for implementing physically-implementable grasp approaches, positioning and posing. Data indicating the characteristics is provided to the system.

Another focus, facilitating and expediting grasp approach, position, and pre-grasp pose planning includes modeling a grasp volume of the grasping device. Multiple models are used to capture characteristics of the grasping-device and also of the target object.

Example models include a sphere, a cylinder, and a convex hull. In one embodiment, the latter corresponds to a general shape or volume formed by members (e.g., fingers) of the grasping device being in a pre-set pose (e.g., a slight, intermediate, or large pose). These models represent a range of the interior volume within which an object to be grasped could fit in. For a specific grasping device, these volume models capture a series of interior volumes ranging from the smallest volume to the largest feasible volume.

The grasping-volume model is not limited to the shapes, or shaped volumes described (e.g., sphere, cylinder, hull), and is not limited to including a single shape or shaped volume in the model. The model can include, for example, a layered volume, or a stacked volume model including two or more shapes or shaped volumes that could each on their own model a grasping volume, such as in connection with a simpler and/or smaller subject object. And such aggregated or combined models need not be stacked in terms of one model component e.g., sphere or cylinder, being stacked vertically on top of another. In one embodiment, such vertical stacking is the case. As a particular example, the combined stacked volume model can resemble a wedding cake where different layers, e.g., cylinder, have different shapes and/or sizes (widths, heights, etc.). E.g., the layers can change from top to bottom, or vice versa, from a relatively-short and fat cylinder to a more-slim and tall cylinder. The model components of combined models can have any relative positioning. For instance, one or more of the model components of combined models can abut an adjacent one or more model components, overlap one or more adjacent model components, be nested in one or more adjacent model components, etc. Two examples are shown in FIGS. 24 and 25. FIG. 25 shows a type of combined model that can be considered as a type of the stacked, e.g., cake, configuration described above. In a contemplated embodiment, at least one of the model components does not overlap with any other model component in the combined model. In another contemplated embodiment, at least one of the model components does not contact another model component in the combined model. Each model, whether simple or more complex, has its own parameters used to define its location and orientation in the processing of the algorithm of the present technology.

Modeling the grasping device, which process can also be referred to as characterizing, estimating, or parameterizing the grasp or grasp volume, provides means to efficiently determine the grasp approach, position, and pre-grasp pose for any 3D complex parts.

With the grasping volume models, the goal of the grasp planning algorithm with environment constraints is simplified to find a common intersected volume between the grasper's interior volume and an object's volume. This intersected volume can be any portion of the grasped object. This intersected volume can be placed on a specific portion of the grasped object when desired for a specific grasping purpose, such as enclosing or as close as possible to the object's mass center for a pick-and-place purpose. This intersected volume can ensure that a number of grasp contacts can be made between the object and the robotic fingers when closed. Maximized intersected volume can be used when it is desired to wrap robotic fingers around the object as much as possible. This intersected volume between the object and the grasper is placed such that the grasper is free from colliding with other elements in its environment such as tables or walls or other objects nearby.

The very-high efficiency for the grasp planning algorithm is due at least in part to the described algorithm and related techniques such as employing the volume models of the grasping device, determining a specific pre-grasp pose and its volume for a specific approach direction, and finding the intersected volume between an object and the grasper volume that is within free space. This technology transforms a difficult problem of planning a desirable grasp based on the extremely large number of possible hand approach, position and pre-grasp poses to a simple problem of intersecting two volumes at a desirable portion of an object such that it is free from other environment constraints.

In one aspect, the present technology is a system including a processor and a computer-readable medium having instructions that, when executed by the processor, causes the processor to perform operations, for planning a grasping-device approach to an object by a grasping device, a pre-grasp device position, and a pre-grasp device pose. The operations comprise obtaining input data including grasping-device data, object data, and environmental-constraint data, determining, based on the grasping-device data, a grasp volume model, determining an initial or test approach vector, and determining, using the vector, the constraint data, and the model, whether the initial approach vector modification is needed. The operations also include modifying, if modification is needed, the initial approach, yielding a resulting, final, approach vector, and determining, if modification is not needed, that the initial approach is the resulting, final, approach vector. And the operations include determining a virtual floor indicating a position below which the grasping device cannot move, and determining, based on the resulting vector, virtual floor, model, and object data, the device approach, position, and pose.

In one embodiment, determining the grasp-volume model is based at least in part on the grasping-device data.

In an embodiment, determining the grasp-volume model includes selecting the grasp-volume model from a plurality of pre-computed candidate models.

In an embodiment, determining the grasp-volume model is based at least in part on the object data.

In one embodiment, the grasp-volume model determined is one of a group consisting of a spherical grasp-volume model, a cylindrical grasp-volume model, and a convex-hull grasp-volume model.

In one embodiment, determining the grasp-volume model includes determining a type of grasp to be used.

In an embodiment, the type of grasp is selected from a group consisting of a precision grasp, a power grasp, a hook grasp, and some combination of the precision grasp, the power grasp, and the hook grasp.

In an embodiment, type of grasp is indicated in the object data or the environmental-constraint data.

In an embodiment, determining the grasp-volume model is based on at least one variable selected from a group consisting of an available amount of output energy of the device, an available amount of output force of the device, a preferred amount of output energy of the device to be used, and a preferred amount of output force to be exerted by the device.

In an embodiment, obtaining the grasping-device data comprises generating at least part of the grasping-device data.

In one embodiment, obtaining the grasping-device data comprises receiving the grasping-device data from a storage device associated with the grasping device.

In an embodiment, wherein the environmental-constraint data includes a contact requirement related to the object, and the contact requirement relates to a trigger associated with the object.

In one embodiment, wherein determining the test approach vector is performed using at least one characteristic selected from a group consisting of a center of mass of the object, a major axis of the object, and a minor axis of the object.

In one embodiment, determining the test approach vector is performed using the environmental-constraint data.

In one embodiment, modifying the test approach vector comprises using a net direction of all limitations, for which data has been obtained, affecting object approach.

In an embodiment, modifying the test approach vector comprises processing data indicating at least one motion selected from a group consisting of an unfeasible motion, a more-preferred motion, and a less-preferred motion.

In an embodiment, determining the virtual floor comprises performing an intersection analysis including determining a preferred intersection of the grasp volume model and a volume of the object.

In one embodiment, the environmental-constraint data includes the virtual floor data and determining whether modification to the test approach vector is needed is based also on the virtual floor data.

In another aspect, the present technology sets for a method, performed by a system using a processor, and including any of the operations mentioned above.

In still another aspect, the present technology includes a computer-readable storage device configured like the computer-readable medium described above.

Other aspects of the present invention will be in part apparent and in part pointed out hereinafter.

DESCRIPTION OF THE DRAWINGS

FIG. 2 illustrates an example member of the grasping device, and characteristics thereof.

FIG. 3 is a surface-and-joint rendition of a three-member grasping device, in a three-dimensional coordinate frame, which can be defined to as the reference from of the robotic grasping, or robotic grasper frame.

FIG. 4 illustrates the three-member grasping device in an intermediate pre-grasp pose, with a grasping volume thereof modeled as an intermediate-sized sphere.

FIG. 5 illustrates the three-member grasping device in the medium pre-grasp pose, with a grasping volume thereof modeled as a vertical cylinder.

FIG. 6 illustrates the three-member grasping device in the medium or intermediate pre-grasp pose, with a medium grasping volume thereof modeled as a horizontal cylinder.

FIG. 7 illustrates the three-member grasping device in the intermediate pre-grasp pose, with the grasping volume thereof modeled as a medium convex hull.

FIG. 8 illustrates the three-member grasping device in the large pre-grasp pose, with the grasping volume thereof modeled as a large convex hull.

FIG. 9 illustrates the three-member grasping device in the small pre-grasp pose, with the grasping volume thereof modeled as a small convex hull.

FIG. 10 illustrates an example complex object to be grasped, and a center of mass, major axis, and minor axis of the object.

FIG. 11 illustrates the object of FIG. 10 resting on a surface, such as a table top, forming a constraint for consideration in planning the grasp approach, position, and pre-grasp pose.

FIG. 18 illustrates another, relatively-medium, complex object, resting on a surface, forming a constraint, and the five-member grasping device grasping a handle portion of the object so that a first member of the device overlays a trigger of the object.

FIG. 21 illustrates a first example method, for obtaining input data for use in planning a grasp approach, position, and pre-grasp pose for implementation by the grasping device.

FIG. 23 illustrates an example computer system for use in performing functions of the present technology.

FIGS. 24 and 25 illustrate examples of a combined grasping-volume model, according to embodiments of the present technology.

FIGS. 26-29 illustrate visualizations of example intersection analyses involving virtual grasp volumes overlapping or intersecting with virtual representations of the subject objects under various environmental constraints (table, tall box, corner, shallow box, respectively), according to embodiments of the present technology.

Like elements in the figures are indicated by the same reference numeral.

DETAILED DESCRIPTION

Figure 1:
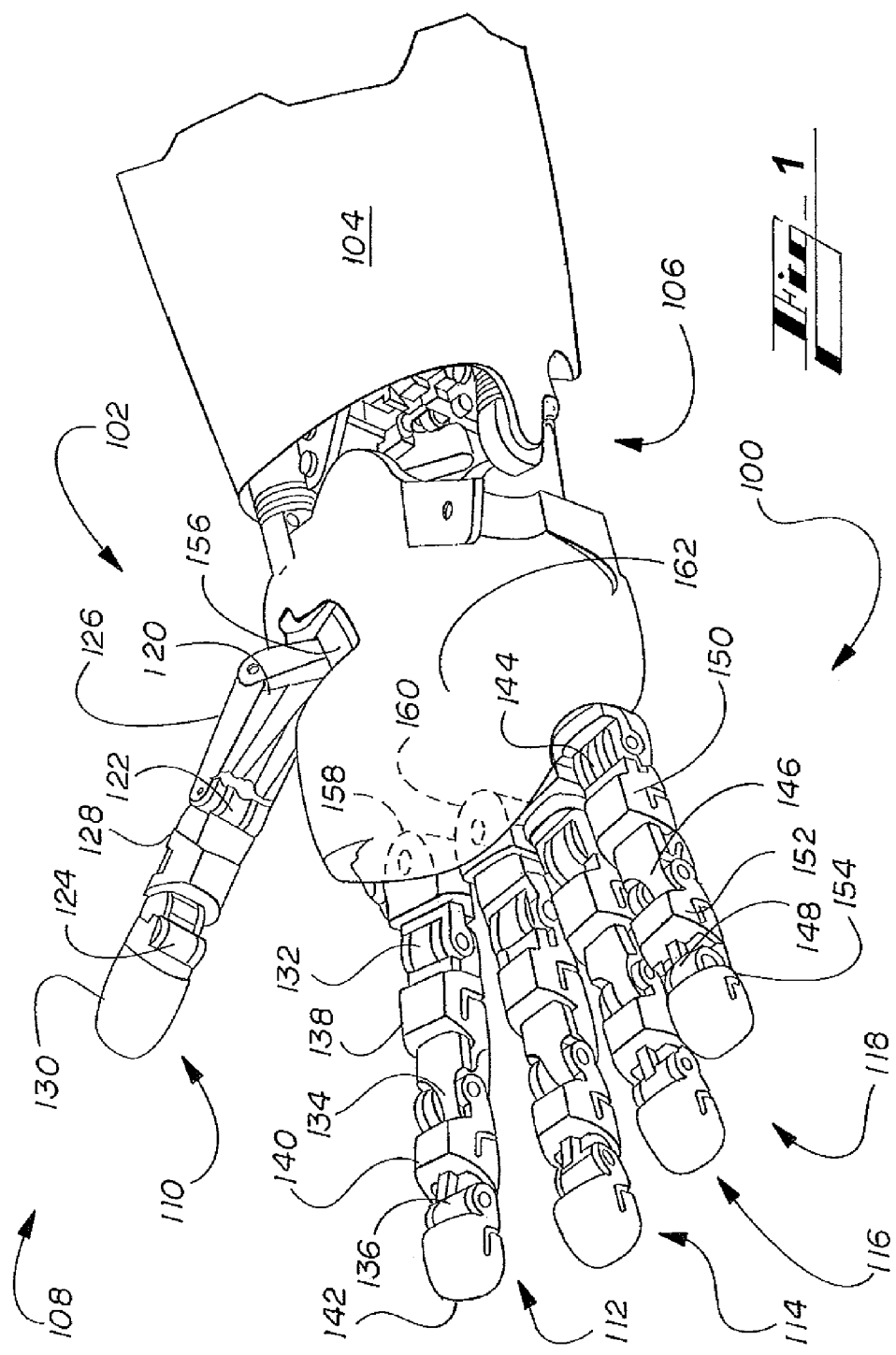
FIG. 1 illustrates an exemplary five-member grasping device.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure.

Therefore, specific structural and functional details disclosed herein are not to be interpreted as limiting, but merely as a basis for the claims and as a representative basis for teaching one skilled in the art to employ the present disclosure.

I. Overview of the Disclosure

The technology described herein facilitates grasping of a complex object using a robotic grasping device, such as a robotic hand. The technology generates, or plans, or computes, a grasp approach, position relative to the object, and pre-grasp pose for the device.

The approach is planned to position or place at least one portion of the grasping device, e.g., a palm of the grasping device, adjacent the object as desired for facilitating the grasping as required for power grasps, precision or pinch grasps, hook grasps, or other types of grasps.

Input for the planning includes grasping-device data, such as robot finger shape, link lengths, and joint ranges (e.g., maximum and minimum angles of rotation). The input also includes object data, including object shape, dimensions, and/or pose. And if there are any constraints, such as walls near the object affecting an approach to it, the input includes constraint data.

The grasp approach, position, and pre-grasp pose planned according to the present technology allow significantly more feasible and robust grasping of objects as compared to conventional systems. The process is fast in part by a process involving modeling a grasp, or grasp volume, of the grasping device and finding a desired volume intersection between the grasping device and the object, wherein the object can be considered in this case to be in the free space.

The grasping device can have any of a wide variety of configurations without departing from the present disclosure. The technology could be implemented using a device having, for example, any number of members, or fingers—e.g., two, three, four, five, or more. The members can have the same or different sizes, number of links, size of links, degrees of freedom (DOF), etc.

The device and parts thereof can be referred to by any of a variety of names without departing from the scope of the present disclosure. The device can be referred to as, for example, a grasping device, a grasper, a grasp device, a gripper, a gripping device, a robot or robotic grasper, gripper, or hand, or the like. The term grasping device is used primarily herein by way of example and is not to limit the type of device that can be used. Adjustable members or appendages of the device are referred to herein primarily as members or fingers, but can be referred to in other ways.

II. Characteristics of the Grasping Device

Now turning to the figures, and more particularly to the first figure, FIG. 1 illustrates a schematic block diagram of a grasping device in accordance with an embodiment of the present disclosure. The grasping device is referred to in FIG. 1 by reference numeral 100.

II.A. Grasping Device Components—FIG. 1

With continued reference to FIG. 1, the grasping device 100 includes a grasping, or hand, portion 102. The grasping device 100 includes or is connected to a robotic arm 104. A macro joint or wrist 106 connects the hand 102 and arm 104.

As provided, the hand 102 of the grasping device 100 can include any number of fingers 108. The example device 100 of FIG. 1 includes five (5) fingers, analogous to a human hand. The fingers of this example device 100 can be referred to herein as a thumb 110, a first or index finger 112, a second or middle finger 114, a third or ring finger 116, and a fourth, last, end, or little finger 118.

Each finger 108 includes at least one joint and at least one link. The links of three of the five fingers of the example device 100 of FIG. 1 are identified by reference numerals. The thumb 110, for example, includes first, second, and third joints 120, 122, and 124 along its length. The joints separate first, second, and third links 126, 128, 130.

The thumb 100 of the hand, if present, can include other number and location of joints, and so other numbers and sizes of links. The same applies to each appendage or finger 108.

Similarly, the illustrated exemplary first or index finger 112 includes first, second, and third joints 132, 134, and 136 along its length. The joints separate first, second, and third links 138, 140, 142.

Likewise, the illustrated exemplary fourth finger 112 includes first, second, and third joints 144, 146, and 148 along its length. The joints separate first, second, and third links 150, 152, 154.

Each of the fingers 108 can include, in addition to the joints along a grasping plan for the finger 108, can include one or more additional joints allowing the finger to move in one or more other directions. Three example additional joints are indicated in FIG. 1 by reference numerals 156, 158, 120, 160.

The other direction(s) can be, for instance, a lateral, or yaw, motion, whereby the finger moves about the additional joint toward or away from an adjacent finger. By way of example, if the additional joints 158, 120, 160 of the first and second fingers 108, 110 were lateral or yaw joints, the fingers 108, 110 could move about their respective additional joints 158, 160 to cause the hand to make a scissoring motion.

II.B. Degrees of Freedom—FIG. 1, Cont.

As introduced above, the grasping device 100 has a plurality of degrees of freedom. Each degree of freedom corresponds to one or more separately-controllable, separately-actuatable, aspects of the device 100, and each finger 108 is associated with at least one degree of freedom controlling motion of the finger 108. In one embodiment, a separate actuator, motor, or actuating element is associated with each DOF.

As an example DOF distribution, the five-fingered device 100 can have twelve (12) degrees of freedom. A five-finger hand can, for instance, have twelve or more degrees of freedom (DOF), or separately-movable elements. A DOF breakdown for an example five-finger robot hand resembling a human hand includes four DOF for the thumb, three DOF for each of the index finger and the middle finger, one DOF for the ring finger, and one DOF for the little finger.

If each of the joints of the fingers of a five-fingered hand, such as that shown in FIG. 1 was separately controllable, in one example, the hand could have eighteen (18) degrees of freedom—i.e., four (4) DOF for each of the separately-controllable joints of the thumb 110, the first finger 112, and the second finger 114, and three (3) separately-controllable joints for each of the third and fourth fingers 116, 118.

For the 12-DOF five-finger example, the DOF include four (4) DOF for the thumb 110, corresponding to each of the separately-controllable joints 120, 122, 124, 156 of the thumb 110. The 12 DOF also include one (1) DOF corresponding to the separately-controllable additional first-finger joint 160, one (1) DOF corresponding to the first, separately-controllable joint 132, and another DOF corresponding to the two distal joints 134, 136, which are controllable together, not separately.

The 12 DOF of the example also include one (1) DOF corresponding to each of the separately-controllable second-finger additional joint 162, the separately-controllable first joint, and another DOF corresponding to the two distal joints, which are controllable together (the second-finger joints beyond the additional joint 162 are not identified by reference numerals in FIG. 1 to simplify the illustration).

The 12 DOF further include one (1) DOF corresponding to the three joints of the third finger 114, which are controllable together (the third-finger joints are not identified by reference numerals), and one (1) DOF corresponding to the three joints 144, 146, 148 of the fourth finger 116, which are controllable together.

II.C. Grasping-Device Member Metrics—FIG. 2

With continued reference to the figures, FIG. 2 illustrates an example gripping member 112 of the gripping device holding a complex object 200, and related metrics, including joint angles, link lengths, and contact lengths, according to an embodiment of the present disclosure.

While a somewhat complex object 200 is shown in FIG. 2, the object can be a simple object, such as a sphere or cylinder.

The member 112 illustrated can be considered any of the fingers of the grasping device. For description purposes, reference numerals corresponding to the first finger 112 are presented. The joints called out in FIG. 2 are the first, second, and third joints 132, 134, 136 causing the links 138, 140, 142 of the finger 112 to move along at least one plane.

Input data to the algorithm of the present system, whether obtained by receiving the data and/or generating the data, can include a number of members 112, and dimensions thereof, such as lengths 212, 218, 220, of the links 138, 140, 142.

An angle of movement for the first link 138 is indicated by reference number 204. The angle 204 is measured between a minimum angle 208 for the link 138 and a maximum angle 210 for the link.

Contact lengths 206, 214, 216 are also shown. The lengths are measured between the joint below each contact point and the contact point.

Relevant input data for the upper links include the link lengths 218, 220, and variables include angles 222 and 224, and example contact points are shown at 506 and 508. A finger-print area of the finger 112 is indicated by numeral 213.

In at least some situations, such as when a finger 112 is predicted to contact the part only at the last link, it is preferred that the contact on the last link be at, near, or below the finger-print area 213.

Characteristics, movements, and control of the parts of the fingers of the grasping device 100 are described further below in connection with the methods of the present technology.

III. Three-Member Device in Surface-Joint View—FIG. 3

As provided, FIG. 3 is a surface-and-joint rendition of a three-member grasping device in a three-dimensional coordinate frame.

The device is indicated by reference numeral 300 in the figure. The three-members are labeled 302, 304, 306, and a palm portion of the hand is labeled 308.

The coordinate frame includes axes 310, 312, 314. In one embodiment, the coordinate frame describes the location of the grasping device relative to other coordinate frames, such as a coordinate frame of the object, or an environmental constraint, etc.

Each of the members of the example device 300 includes three links 316, 318, 320. The illustrated square at each link 316, 318, 320 symbolizes the contact surface for the link.

The first link 316 is connected to the palm 308 by a first finger-curling link 322. A second finger-curling joint 324 connects the first link 316 and second link 318, and a third joint 326 connects the second and third links 318, 320.

The device 300 can also see one or more lateral, or yaw, joints, like the labeled joint 328. As can be seen, the yaw joint allows the finger to swivel, about the joint, toward or away from adjacent fingers.

IV. Grasp Volume Models, their Generation and Usage

As referenced above, the functions of the present technology include modeling the range of feasible volume of the grasping device. The modeling function may also be referred to by other terms, such as characterizing, parameterizing, approximating, the like, or other.

Modeling the range of feasible grasping volume simplifies the computation for planning a grasp approach, position, and pre-grasp pose for the device, thus enabling real-time grasp planning.

The computer-executable code of the present system can be configured so that the grasping volume is modeled in any of a wide variety of manners. In some embodiments, the grasp volume is modeled as a certain pre-determined three-dimensional shape, or one of a plurality of pre-determined three-dimensional shapes.

Example shapes for modeling grasp volumes include sphere and cylinder. Another example shape for models is a convex hull having a shape particular to the grasping device. For example, a convex hull model for a three-member device would have a height, or thickness, extending between three corners, or vertices. A convex hull model for five-member device would have a height or thickness extending between five corners, or vertices.

Examples grasp volume models are shown in the figures. Spherical volume model is shown in FIG. 4. Cylindrical volume models are shown in FIGS. 5 and 6. A range of cylindrical volume models is also shown in FIGS. 24 and 25. Convex hull volume models are shown in FIGS. 7-9.

The grasp-volume models are employed as computation entries for multiple purposes. One purpose is to represent available volume of a specific grasping device within which at least a portion of the object should be placed. Another purpose is to associate the specific grasping volume with the pre-grasp pose for the specific grasping device.

Actual generation of the grasp volume models is independent of the planning algorithm. It can be done once when any given grasping device and its parameters are known, independent of information about the object(s) to be grasped by the device.

Figure 22:
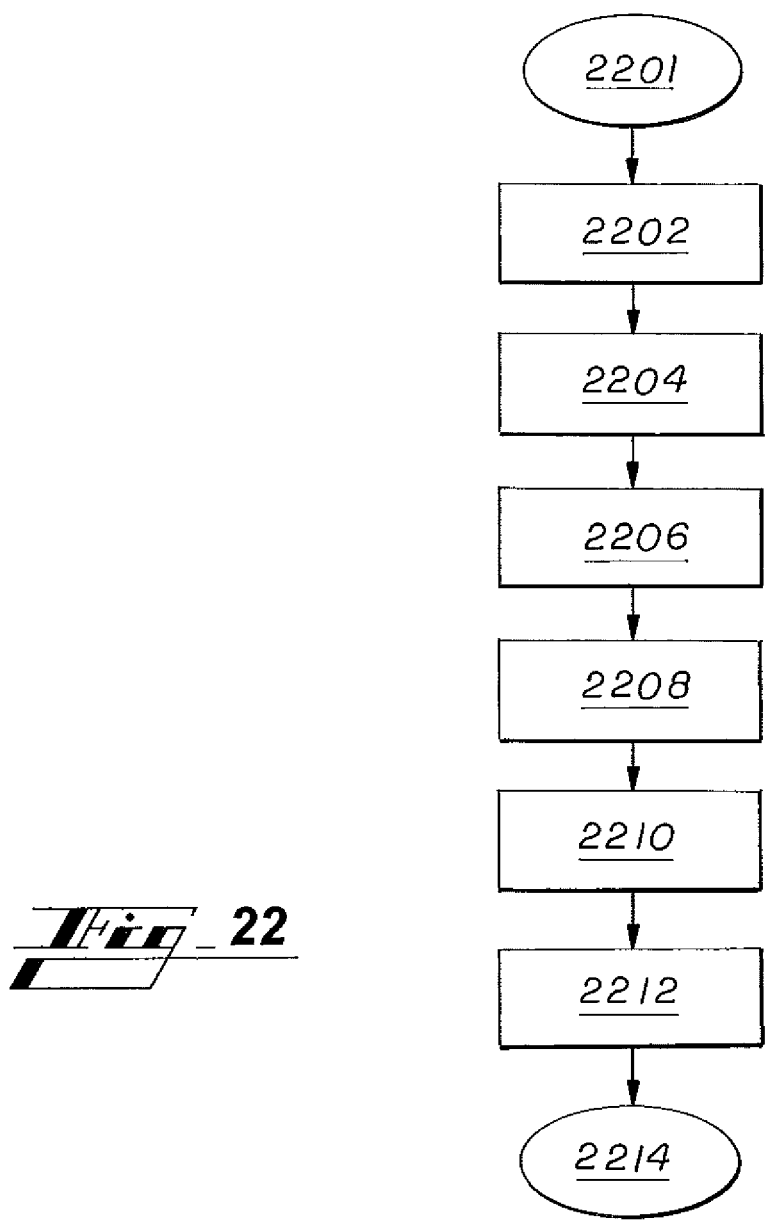
FIG. 22 illustrates a second example method, for planning, using said input data, the grasp approach, position, and pre-grasp pose for implementation by the grasping device.

Use of the grasp volume models enables real-time planning of a grasp approach, position, and pre-grasp pose for the object and it is described further herein regarding the other figures, including the algorithms of FIGS. 21 and 22.

IV.A. A Single Pre-Grasp Pose Example and its Cylindrical Volume Models—FIGS. 5 and 6

As provided above, FIG. 5 and FIG. 6 illustrate the three-member grasping device in a single pre-grasp pose, with its corresponding grasping volume thereof modeled as cylinders 500 and 600.

The cylinder volume model is shown in FIG. 5 in an upright, vertically-disposed, direction, while the cylinder volume model is shown in FIG. 6 in lying-down, in horizontally-disposed direction or pose. These cylindrical volume models define the interior volume of the hand that a portion of an object can be placed and its direction can be horizontally or intermediate horizontal or vertical.

As can be seen in the figure, each of the members 302, 304, 306 is in generally the same pose, intermediate a fully-extended, or fully-open, pose for the member and a fully-contracted, or fully-closed pose for the member. While each member is shown having about the same level of extension, the system described herein may generate or select the grasping model to correspond to a pose of the grasping device 300 in which not all members are extended to the same extent.

The cylindrical volume model is generated or selected by the computer processor, executing the computer-readable code described below, with consideration given to grasping-device characteristics (e.g., finger sizes, number of fingers, etc.). In one embodiment, the resulting model size will correspond generally to a pose of the hand, which corresponds to a general interior volume of the device 300.

IV.B. The Feasible Range of Pre-grasp Poses and Corresponding Volume Models—FIGS. 24 and 25

FIG. 24 illustrates stacked cylindrical volume models lying-down, in horizontally-disposed direction. FIG. 25 illustrates stacked cylindrical volume models in an upright, vertically-disposed, direction. These cylindrical volume models define the interior volume of the hand that a portion of an object can be placed and its direction can be horizontally or intermediate horizontal or vertical. Each of the stacked volume models has its own associated pose of the grasping device as discussed above.

The model components of stacked models can have any relative positioning. For instance, one or more of the model components of combined models can abut an adjacent one or more model components, overlap one or more adjacent model components, be nested in one or more adjacent model components, etc.

As mentioned, and described further below, the model is generated by the computer processor, executing the computer-readable code described below, In one embodiment, the resulting model size will correspond generally to a pose of the hand that corresponds to a general size or volume of the grasp of the device 300.

IV.C. A Single Pre-Grasp Pose Example and its Sphere Volume Model—FIG. 4

As provided above, FIG. 4 illustrates the three-member grasping device in a single pre-grasp pose, with a corresponding grasping volume thereof modeled as a sphere 400.

As can be seen in the figure, each of the members 302, 304, 306 is in generally the same pose, between their fully-contracted, or fully-closed, pose for the member and the fully-extended, or fully-open, pose. While each member is shown having about the same level of extension, they can differ.

As mentioned, and described further below, the model is generated by the computer processor, executing the computer-readable code described below, In one embodiment, the resulting model size will correspond generally to a pose of the hand that corresponds to a general size or volume of the grasp of the device 300.

IV.D Three Pre-Grasp Pose Examples and their Corresponding Convex Hull Volume Models—FIGS. 7, 8, and 9

FIG. 7 illustrates the three-member grasping device in a medium or intermediate pre-grasps pose, with a corresponding medium grasping volume thereof modeled as a medium convex hull 700.

FIG. 8 illustrates the three-member grasping device and coordinate frame of FIG. 3 in a large pose, with a large grasping volume thereof modeled as a large convex hull 800.

FIG. 9 illustrates the three-member grasping device and coordinate frame of FIG. 3 in a small pre-grasp pose, with a small grasping volume thereof modeled as a small convex hull 900.

As can be seen in the figure, each of the members 302, 304, 306 is in generally the same, pose in either their fully-contracted/closed pose or the fully-extended/open pose, or a pose between these two extreme poses. While each member is shown having about the same level of extension, they can differ.

In regards to each model discussed, and as provided above, each model, of any of various shapes and sizes, is generated independent of the object to be grasped. Rather it is generated based on characteristics of the grasping device (e.g., robotic hand) being employed.

These scenarios could also be accommodated by another model, such as a sphere, cylinder, or other, and the algorithm will control which the computer processor selects under the circumstances. The size of the model, cylinder, sphere, or other, selected for the immediate task depends on, e.g., the size of the target grasp area of the object, the position of the object, the pose of the object, and/or other.

V. 3D Objects, their Shapes, and Major and Minor Axes Thereof—FIG. 10

As provided above, FIG. 10 illustrates an example complex object to be grasped, and a center of mass, major axis, and minor axis of the object.

The object 1000 has a center of mass indicated in FIG. 10 by numeral 1002. A major axis 1004 of the object 1000 passes through the center of mass. A minor axis 1006 of the object 1000 also passes through the center of mass 1002.

The object data referenced above and described further below, in connection with FIG. 21, for example, are described in a coordinate frame defined as the object frame. The object data can include the location of the center of mass and the major and minor axes. The object data can include other object characteristics as well, including object mass or weight, object dimensions, and object pose, or position in six-dimensional space.

VI. Objects and their Environment Constraint(s)

As described above, the algorithm considers any one or more physical elements or conditions affecting the approach being planned as environmental constraints.

Example constraints include surfaces of tables, boxes, walls, and other objects or parts adjacent the object.

VI.A. Objects and Supporting-Surface Constraint—FIG. 11

As provided, FIG. 11 illustrates the object of FIG. 10 resting on a surface, such as a table top, forming a constraint for consideration in the grasp approach, position, and pre-grasp pose planning, in the coordinate frame of FIG. 3.

The example object 1000 shown is automotive part, namely, a type of airbag sensor for use in an automobile. In FIG. 11, the part is standing in a vertical disposition on a surface 1100.

The surface 1100 is a constraint that, like all constraints, the computer processor, executing the computer-executable instructions described herein, considers in planning the grasp approach, position, and pre-grasp pose. The grasp approach, position, and pre-grasp pose must consider, for example, that the members, prior to, during, or following the grasping action, cannot extend below the surface 1100. The environment elements are used in the planning algorithm as constraints that are limiting the choices of grasp approach, position and pre-grasp pose for the grasper.

Processing of environment constraints, and use in planning a grasp approach, position, and pre-grasp pose for the grasping device, are described further herein regarding the other figures, including the methods of FIGS. 21 and 22.

VI.B. Object and One or More Adjacent Object Constraint

As provided above, environmental constraints can also include one or more objects adjacent or near the object to be presently grasped. The relative positioning, size and shape of the objects, or of the objects and any static constraints (e.g., nearby wall) can be received as input to the system and/or generated by the computer processor executing the code described herein based on sensor input, such as input from one or more cameras and/or other sensors.

VII. OBJECT AND BOX CONSTRAINT—FIG. 12

Figure 12:
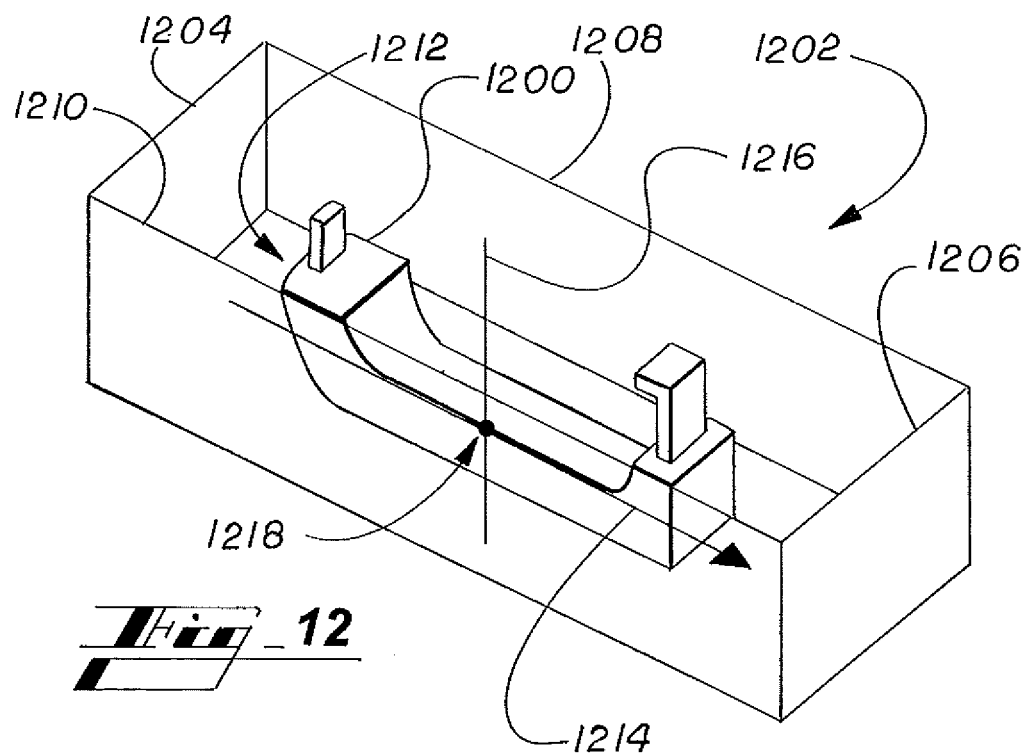
FIG. 12 illustrates another complex object, resting in a box, forming constraints, with the major and minor axes, thereof.

As provided above, FIG. 12 illustrates another complex object, resting in a box, forming constraint, with the major and minor axes, thereof, and the coordinate frame of FIG. 3. The example object 1200 shown is also automotive part, namely, a type of door handle for installation on an inside of a door of an automobile. In FIG. 12, the part is lying in a horizontal disposition on in a box 1202.

It will be appreciated that while the object 1200 is shown in one pose, in a box, in FIG. 12, the object can be disposed differently, depending on circumstances, such as how the object is received packaged from a supplier, how the part and box are handled at a destination assembly plant prior to the grasping device grasping the object, etc.

Figure 13:
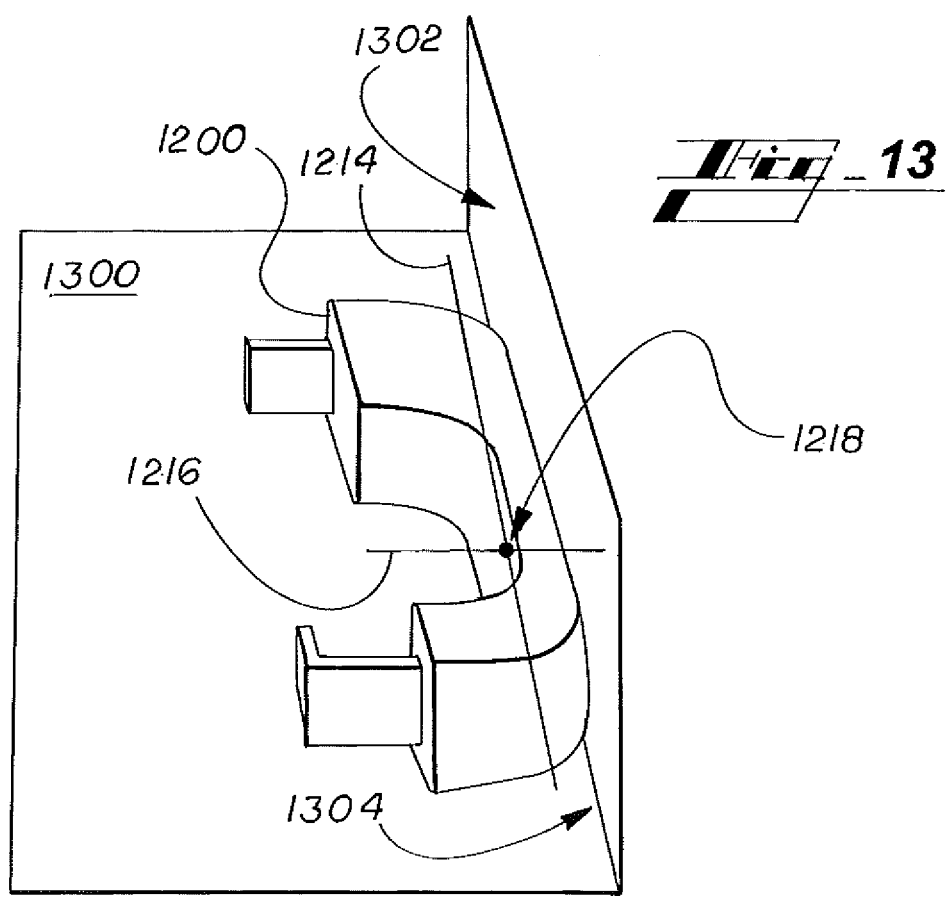
FIG. 13 illustrates the complex object of FIG. 12, resting on a surface, forming a constraint, and adjacent a corner formed by the surface and a wall, forming a constraint.

Even limiting the poses to fully or primarily horizontal poses, it will still be appreciated that the object 1200 can lie in the box, or on a surface, in numerous different ways—reference, e.g., FIG. 13. Other figures show the same example object 1200 in more of a standing, or vertical position—e.g., FIGS. 14, 15, and 16.

The box 1202 presents multiple constraints that, like all constraints, the computer processor, executing the computer-executable instructions described herein, considers in planning the grasp approach, position, and pre-grasp pose. The approach must consider, for example, that the members, prior to, during, or following the grasping action, cannot extend though any of the box walls 1204, 1206, 1208, and 1210, or through the bottom 1212. Again, the environment elements are used in the planning algorithm as constraints that are limiting the choices of grasp approach, position and pose for the grasper.

In a contemplated embodiment, for scenarios including multiple constraints or constraint elements, such as the box scenario, the constraints are combined or can be considered or viewed as being combined, into a single effective constraint—e.g., a box constraint together representing the multiple limitations of the box, such as its dimensions.

FIG. 12 also shows the major axis 1212 and minor axis 1216 passing through the object, more particularly the center of mass 1218 of the object.

As provided, processing of constraints, and use in planning a grasp approach, position, and pre-grasp pose for the grasping device, are described further herein regarding the other figures, including the algorithms of FIGS. 21 and 22.

VIII. Object and Corner Constraint—FIG. 13

FIG. 13 illustrates the complex object of FIG. 12, resting on a surface, forming a constraint, and adjacent a corner formed by the surface and a wall, forming a constraint.

FIG. 13 shows the same example object 1200 (e.g., car-door handle) as FIG. 12. In FIG. 13, the part is lying in a horizontal disposition, different than the horizontal disposition of FIG. 12.

The object 1200 is also shown in FIG. 13 resting on a generally horizontal surface 1300 adjacent a construct, or wall, 1302 extending up from the surface 1300. The surface 1300 and wall 1302 form constraints, or a combined constraint, as described above, for consideration by the computer processor executing the computer-executable code described herein. The pre-grasp, grasping-device, approach planned must consider, for example, that the members of the device, prior to, during, or following the grasping action, cannot extend though the walls 1302 or through the surface 1300 underlying the object 1200. Again, the environment elements are used in the planning algorithm as constraints that are limiting the choices of grasp approach, position and pose for the grasper.

The wall can be generally vertical, or slightly or greatly slanted. The object 1200 can be positioned in a corner 1304 formed by the surface 1300 and wall 1302, such as by contacting both 1300, 1302, or being slightly spaced from one or both of them 1300, 1302.

FIG. 13 also shows the major axis 1214 and the minor axis 1216 passing through the object and, more particularly, through the center of mass 1218 of the object 1200.

IX. Initial Calculated Approach—FIG. 14

Figure 14:
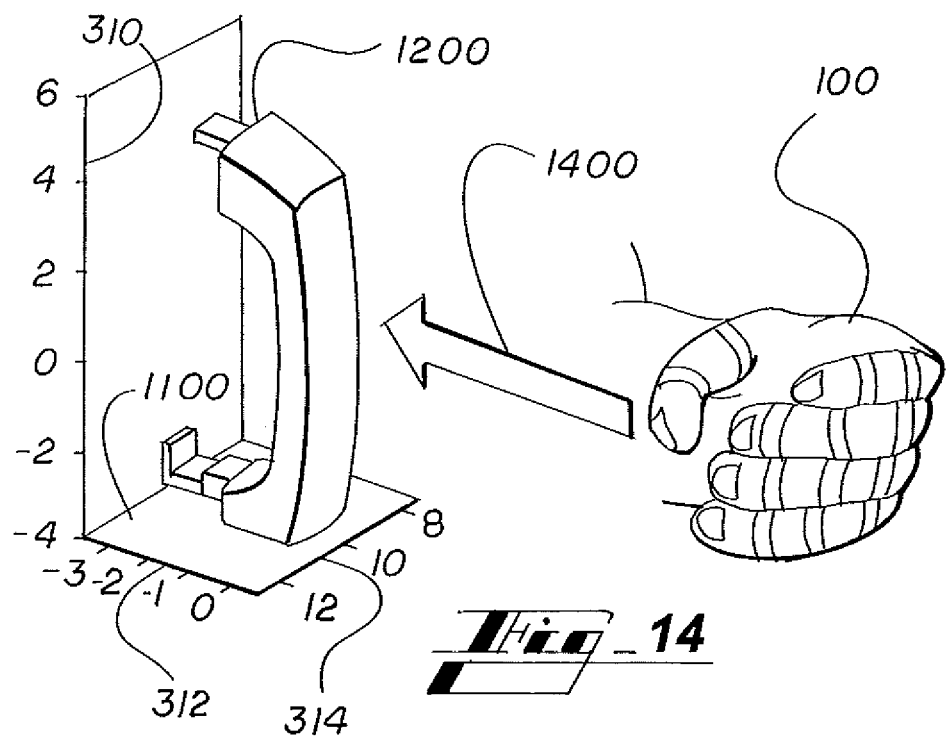
FIG. 14 illustrates the complex object of FIG. 12, resting on a surface, forming a constraint, and an initially-calculated approach for the grasping device of FIG. 1.

FIG. 14 illustrates the complex object 1200 of FIG. 12, resting on a surface 1100, forming a constraint, and an initially-calculated approach 1400 for the grasping device 100 of FIG. 1, in the coordinate frame of FIG. 3.

In some embodiments, the algorithm, embodied in the computer-executable instructions or code described herein, includes one or more operations involving determining or calculating the initial approach for the grasping device. The initial approach can be determined in any of a number of ways. In embodiment, the manner is dependent on a specific purpose of grasping action. Example purposes include a pick-and-place operation, and the others described further below. The initial approach can be towards a center of mass of the object, along one of the minor axes of the object.

In a particular embodiment, the initial approach is calculated generally for approaching the target object at or near the center of mass (COM) of the object. A benefit of grasping an object at or near its center of mass (or, COM, or COM) is that the resulting grasp is generally more stable and robust, lowering the chance of the object slipping in or from the grasp.

In a particular embodiment, the initial approach is calculated generally to approach the target object at or about a vector, or trajectory, coinciding with one of the minor axes of the object. Or, the initial approach is calculated generally to approach the target object at or about a vector that is generally perpendicular to the major axis of the object and passing through the COM.

In some embodiments, this initial determination for the approach direction can be made without using (e.g., considering, processing) any environmental constraints, and in some cases without using any constraints.

Grasping an object in this way is usually beneficial because most objects are longer in one direction (i.e., in the direction of the major axis) than in another direction (i.e., in a direction of one of the minor axes of the object), and these objects are generally easier to grasp, such as by being smaller, or thinner, about the major axis than the minor axis or angles between the axes.

Sections X-XVI—FIGS. 15-20

The following sections corresponding to FIG. 15-20 relate to exemplary representative results produced by a grasp planning algorithm, such as that described throughout herein, and especially in connection with FIG. 22, below.

X. Grasp at Minor Axis about Major Axis of Object—FIG. 15

Figure 15:
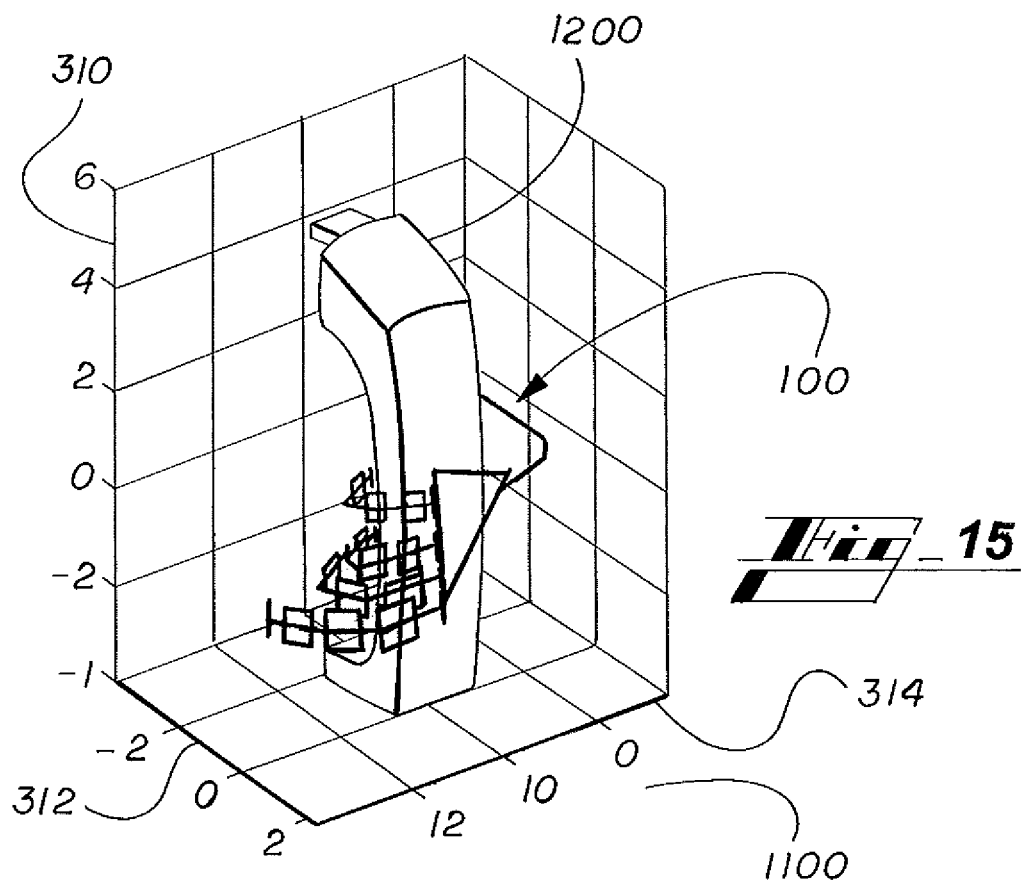
FIG. 15 illustrates the view of the complex object of FIG. 12, resting on the surface forming the constraint, and a surface-and-link rendition of the five-member grasping device of FIG. 1, having made a virtual grasp.

FIG. 15 illustrates the view of FIG. 14, except with a surface-and-link rendition of the five-member grasping device 100, having made a grasp.

The grasp shown, as with the approach in FIG. 14, can be virtual constructs used to plan the actual or final approach. They can be used, e.g., to test the feasibility or optimality of the approach or grasp.

XI. Object in Relatively-Tall Box—FIG. 16

Figure 16:
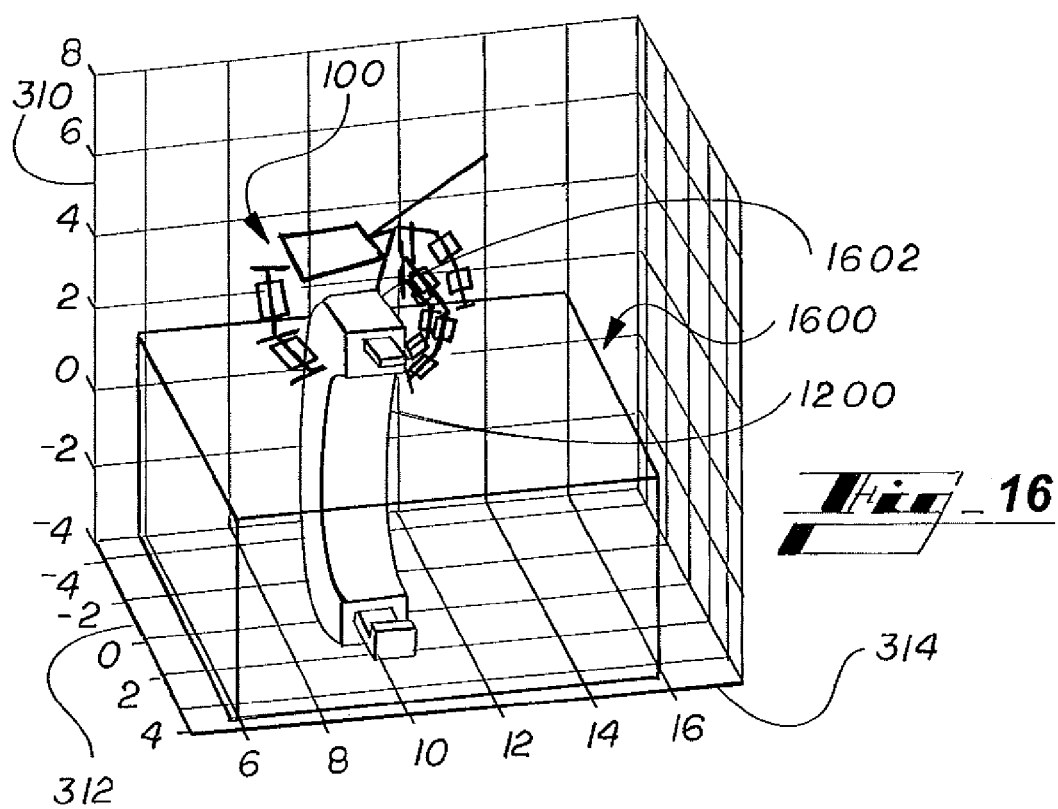
FIG. 16 illustrates the complex object of FIG. 12 resting in a relatively-tall box, forming constraints, and the five-member grasping device, having made a tip-of-the-object grasp.

FIG. 16 illustrates the complex object of FIG. 12 resting in a relatively-tall box, forming constraints, and the five-member grasping device, having made a top- or tip-of-the-object grasp, in the coordinate frame of FIG. 3.

FIG. 16 shows the same example object 1200 (e.g., car-door handle), in generally the same object pose (i.e., standing upright) as in FIGS. 14 and 15.

In FIG. 16, though, the object 1200 is shown positioned in a box 1600. The box 1600 forms constraints, or a combined constraint, as described above, for consideration by the computer processor executing the computer-executable code described herein.

The grasping-device approach planned must consider, for example, that the members of the device, prior to, during, or following the grasping action, cannot extend though the walls or bottom of the box 1600.

As referenced above, and shown in FIG. 16, a grasp approach may include a vector coming generally down toward a top or upper end 1602 of the object 1200. Such a result, in one embodiment is produced naturally by the algorithm, according to the logic described herein, and especially below in connection with FIG. 22.

The code may be configured to prefer this type of approach in this scenario, though a subsequent resulting grasp would not grasp the object 1200 at or adjacent the COM of the object 1200, or along the major axis, because the constraint(s) presented by the box 1600 is controlling over those considerations.

XII. Small Object and Pinch Pose for Grasping it—FIG. 17

Figure 17:
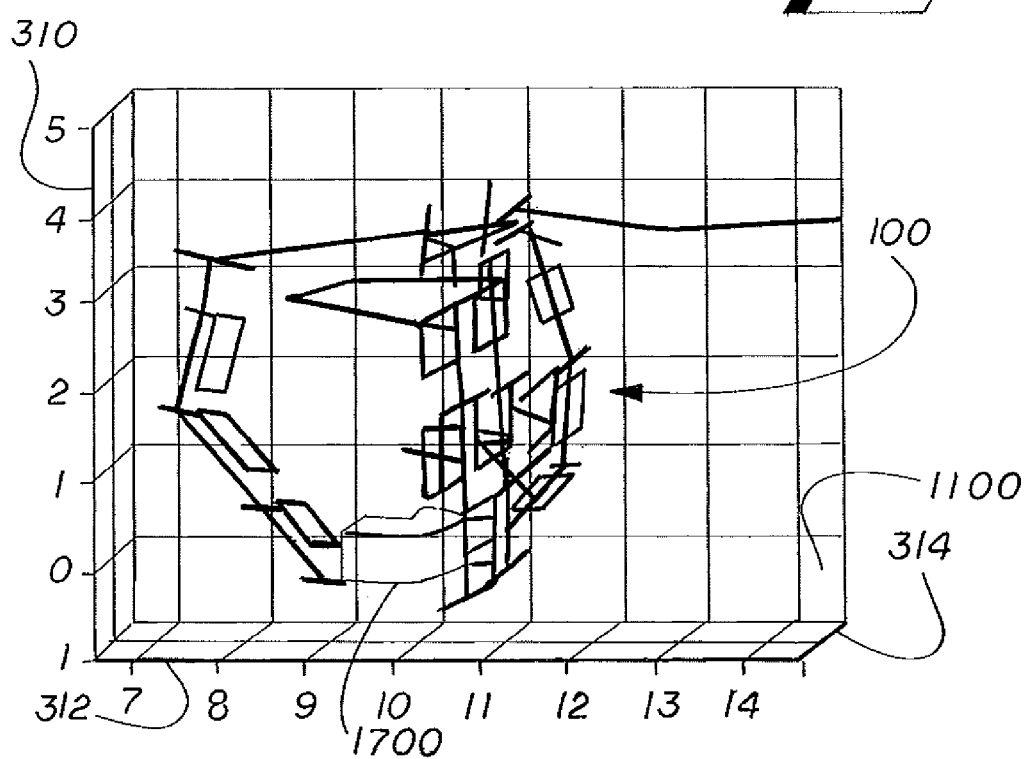
FIG. 17 illustrates another, relatively-small, complex object, and the five-member grasping device taking a small or pinching pre-grasp pose for grasping it.

FIG. 17 illustrates another, relatively-small, complex object, and the five-member grasping device taking a small or pinching pose for grasping it, in the coordinate frame of FIG. 3.

The underlying surface 1100 presents a constraint for consideration in the algorithm.

Considering the relatively-small size of the object 1700, indicated by the object data, the algorithm would direct selection of an appropriate grasp volume model.

XIII. Medium Object Having a Handle and Trigger—FIG. 18

As provided above, FIG. 18 illustrates another, relatively-medium, complex object, resting on a surface, forming a constraint.

The surface 1100 underlying the object 1801 presents a constraint for consideration in the algorithm. The example object 1801 is a type of hand-held power tool, e.g., hand-held drill.

In some scenarios, in addition to the general requirement to grasp, or grasp and move (a so called, pick-and-place act), there is a requirement that the grasping device contact the object in a certain manner. As an example, in addition to the need to grasp the object, e.g., with one or more member 1800 of the device, the situation could require that one or more members 1802 of the grasping device also contact a trigger 1804 (e.g., button, display screen icon or area, etc.) of the object 1801. This can be related to where the intersected volume needs to be.

In one embodiment, the positioning requirement is considered by the computer processor, according to the algorithm, as a constraint. In some embodiments, it is considered instead as a non-constraint directive affecting the universe of potential approaches to those allowing the on-trigger grasp. This is based on the location requirement of the intersected volume needs to be.

Selection of a grasp volume model, for use in real-time planning the grasp approach, does not consider the constraint(s) presented.

From one perspective, selecting the grasp volume model can be viewed as determining how much the fingers should open to allow placement of the hand around an object, along with determining how closed the fingers will need to be to navigate any constraints, such as the walls in the box-constraint example.

XIV. Trigger and Handle-Having Object Lying in Box—FIG. 19

Figure 19:
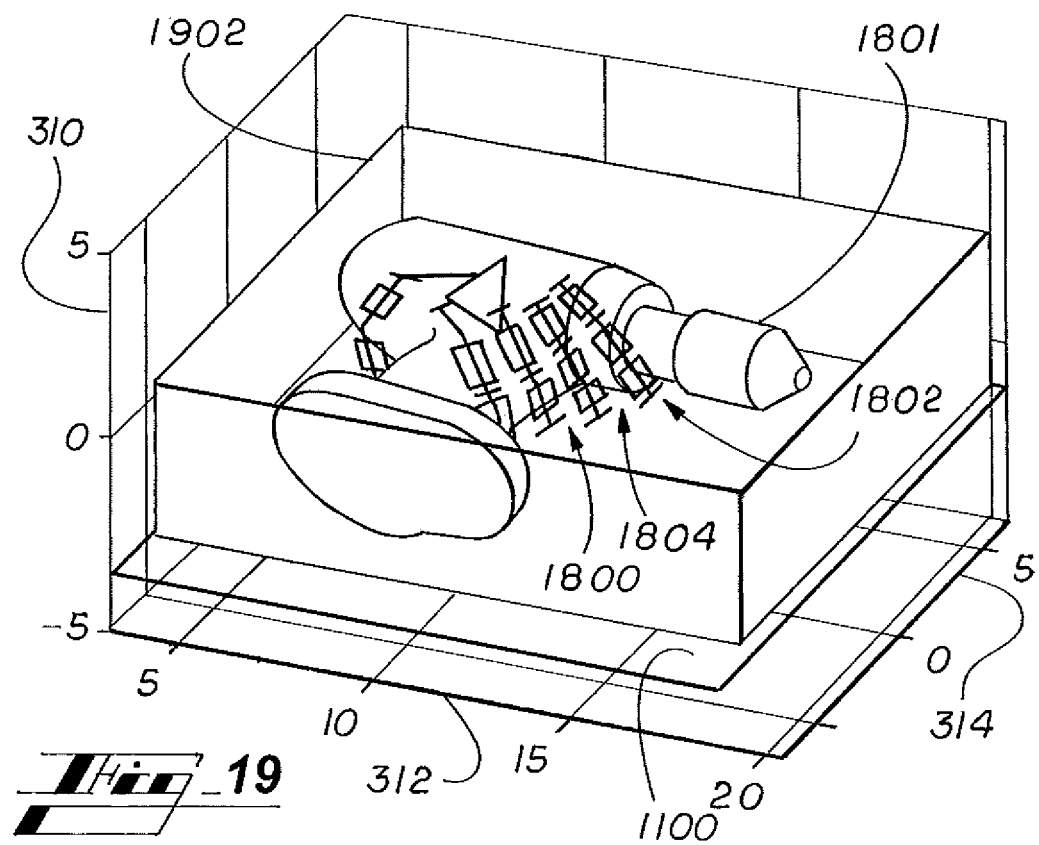
FIG. 19 is a scenario like that of FIG. 18, except with the object lying in a box, forming additional constraints.

FIG. 19 is a scenario like that of FIG. 18, except with the object lying in a box, forming additional constraints.

In the case, the box 1902 underlying the object 1801 presents one or more constraints, as described above.

The descriptions above in connection with FIG. 18, regarding the trigger 1804 and grasp model selection, are applicable also to the situation of FIG. 19.

XV. Trigger and Handle-Having Object Standing in Box—FIG. 20

Figure 20:
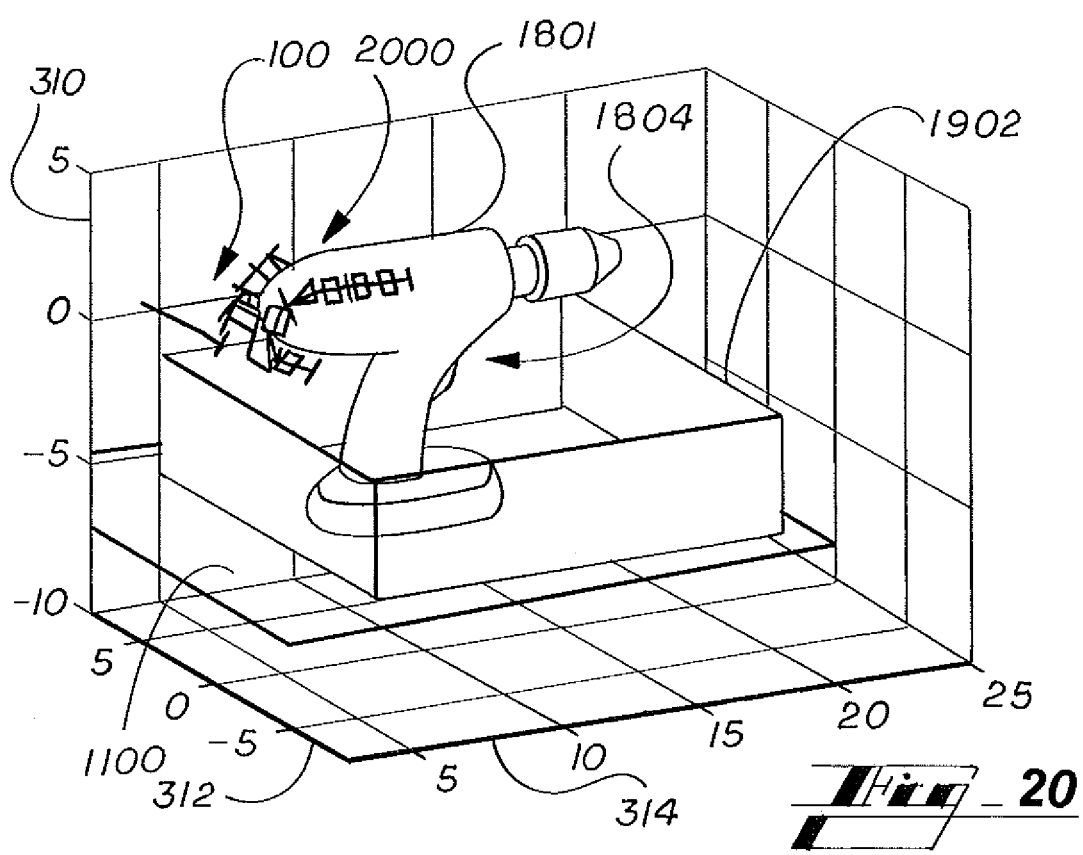
FIG. 20 illustrates is a scenario like that of FIG. 19, but with the object standing upright in the box, and the hand grasping an upper end, or side tip, of the object.

FIG. 20 illustrates is a scenario like that of FIG. 19, but with the object 1801 standing upright in the box 1902, and the hand 100 grasping an upper end, or side tip, of the object.

In the scenario of FIG. 20, there is either no need for the grasping device 100 to contact the trigger 1804 of the object 1801, and/or, considering the constraints, the algorithm determines that it is better for the device 100 to grasp the device at a portion, such as an end 2000, of the object other than the handle of the object 1801.

The code could, for instance, instruct the processor to design an approach that allows the device 100 to easily move the object 1801 to a position, such as resting on a table top adjacent the box 1902, whereat the grasping device 100, or another grasping device (not shown), or a person, can grasp the object so as to contact the trigger 1804.

As provided, processing of constraints, and use in planning a pre-grasp grasping-device approach to the object, are described further herein regarding the other figures, including the algorithms or logic of FIGS. 21 and 22.

As provided, the above sections corresponding to FIG. 15-20 relate to exemplary representative results produced by a grasp planning algorithm, such as that described throughout herein, and especially in connection with FIG. 22, addressed here below.

XVI. Methods of Operation—FIGS. 21 and 22

Operations of the methods described herein, including the methods 2100, 2200 illustrated in FIGS. 21 and 22, are not necessarily presented in any particular order and that performance of some or all the steps in an alternative order is possible and is contemplated.

The operations have been presented in the demonstrated order for ease of description and illustration. Operations can be added, omitted and/or performed simultaneously without departing from the scope of the appended claims. It should also be understood that the methods, including the illustrated methods 2100, 2200 can be ended at any time.

In certain embodiments, some or all operations of this process, and/or substantially equivalent steps are performed by execution of computer-executable instructions, code, or logic, stored or included on a computer-readable medium, such as that describe herein below in connection with the exemplary computer system of FIG. 23.

XVII. Method of Obtaining Input Data—FIG. 21

FIG. 21 shows an exemplary method 2100 for obtaining input data for use in planning a grasp approach, position, or pre-grasp pose, for a grasping device, with respect to an object to be grasped, according to an embodiment of the present disclosure.

The method 2100 commences 2101 and flow of the algorithm or logic proceeds to block 2102 whereat the computer processor obtains data regarding the grasping device, such as any of the grasping devices described herein.

Aspects of the algorithm, described below in connection with FIG. 22, for planning a grasping-device approach and pre-grasp pose, uses the grasping device data, along with object data and environmental-constraint data.

Obtaining the device data can include generating and/or retrieving the device data. Grasping-device data can be retrieved, for example, from a computer-readable storage medium, memory, or database associated with the computer processor performing the algorithm. Such storage devices are described further below in connection with the exemplary computer system illustrated in FIG. 23. It is contemplated that the computer system or at least some of the storage medium mentioned resides at the grasping device or robotic components adjacent the grasping device.

As provided, the present robotic system can include any of a wide variety of grasping devices. Options include robotic hands having one, two, three, four, five, or more fingers. Each hand has characteristics particular to it including the number of, and finger portions controlled by the degrees of freedom (DOF), size of the fingers, size of links between joints, location of joints, axes of rotation, and rotation ranges for joints—e.g., maximum and minimum angles achievable per joint.

These and many other grasping-device characteristics can be represented directly, or indirectly or inferentially, by the grasping-device data.

In a contemplated embodiment, the system to which the grasping device is connected for operation can be readily connected to any of numerous types of grasping devices. In the embodiment, the system determines a type of the grasping device, or at least characteristics thereof from representative data, such as a specifications message (e.g., a push-type message or message responding to an inquiry), received from the grasping device.

The specifications message can be sent, for example, automatically in response to the hand being first installed locally for use. The message data can include the grasping-device data and/or indicate a grasping-device type that the computer processor uses to obtain the grasping-device data, such as from a local or remote database.

With continued reference to FIG. 21, at block 2104, the computer processor obtains data regarding the object. Obtaining the object data can include generating and/or retrieving the object data. As referenced above, the present algorithm for planning a grasp considers the object data, and grasping-device data. In one embodiment, these factors are used in determining where and how the grasping device should be positioned vis-à-vis the object.

The object data can include data indicating the dimensions and pose of the object. In one embodiment, the object data indicates, directly or indirectly, the dimensions and pose of the object in six-dimensional space. The object data can include computer-aided design data, describing the object, its mass, its weight, mass or weight distribution, surface materials, the like, and/or other characteristics or factors. The object data can indicate dimensions of the object surface in terms of three linear dimensions (e.g., X, Y, Z) and indicate pose of the object in terms of three angular or rotational dimensions (e.g., yaw, pitch, and roll positions).

In a contemplated embodiment, the object data is obtained at least in part using one or more local sensors such as a camera.

At block 2106, the computer processor obtains data indicating one or more constraints to device approach. The data can be referred to by a variety of terminology, including constraint data, approach data, environmental-constraint data, the like, or other. Obtaining the constraint data can include generating and/or retrieving the constraint data.

As provided above, constraint data can include environmental constraints, such as environmental factors to be considered in planning the grasp approach for the grasping device, such as the surface on which the object rests pre-grasp, and any lateral side(s) or wall(s).

Environmental constraints can also include one or more objects adjacent or near the object to be presently grasped. The relative positioning of the objects, or of the objects and any static constraints (e.g., nearby wall) can be received as input to the system and/or generated by the computer processor executing the code described herein based on sensor input, such as input from one or more cameras and/or other sensors.

As also provided, the constraints can include requirements related to the object or how it must be contacted, such as a requirement to contact the trigger of the object described and shown in connection with FIGS. 18 and 19.

XVIII. Method of Determining Approach—FIG. 22

As provided, FIG. 22 shows an exemplary method 2200 for planning a grasp approach to an object, position, and pre-grasp pose for implementation by the grasping device, using input data described above.

The method is performed by a computer processor executing instructions or code defining one more algorithms for performing the operations thereof. The algorithm(s) facilitates fast computation of robust and feasible grasp approaches, and final robot-hand positions and poses, for implementation by the grasping device including the hand, for grasping an object, such as a complex three-dimensional object.

The method 2200 commences 2201 and flow of the algorithm proceeds to block 2202 whereat the processor determines an initial, or test, approach vector. The initial approach vector, including benefits of the step 2202, is described in part above.

As provided, the algorithm in some embodiments determines the initial or test approach using the center of mass and major and minor axes of the object to be grasped. And in one embodiment, the initial approach is calculated to generally approach the target object at or near the center of mass (COM) of the object. One stated benefit of grasping an object at or near its center of mass (or, COM, or C-O-M) is that the resulting grasp is generally more robust, lowering the chance of the object slipping in or from the grasp.

Also, in an embodiment, the initial approach is calculated to generally approach the target object at or about a vector, or trajectory, coinciding with one of the minor axes of the object. Or, at or about a vector that is generally perpendicular to the major axis of the object and passing through the COM. In some embodiments, this initial determination of approach direction is made without considering any environmental constraints, and in some cases without considering any constraints.

Grasping an object in this way is usually beneficial because most objects are longer in one direction (i.e., in the direction of the major axis) than in another direction (i.e., in a direction of one of the minor axes of the object), and these objects are generally easier to grasp, such as by being smaller, or thinner, about the major axis than the minor axis or angles between the axes.

With continued reference to FIG. 22, from block 2202, flow of the algorithm proceeds to block 2204. At block 2204, the processor determines a grasp-volume model, such as those described above. The determination is based at least in part on the object data and hand data described above, including in connection with the operations 2102, 2104 of the method 2100 of FIG. 21. Candidate grasp volume models can be pre-computed. Candidate grasp volume models are independent of the object(s) to be grasped, and based, rather, on characteristics of the subject grasping device (e.g., robotic hand features—size, shape, dimensions, etc.). Selection of an appropriate model, of the candidate grasp volume models, includes considering aspects of the object (e.g., size, shape, and location of target grasping surface(s)).

As also provided, above, with the grasping volume models, the goal of the grasp planning algorithm with environment constraints is simplified to find a common intersected volume between the grasper's interior volume and an object's volume. This intersected volume can be any portion of the grasped object. This intersected volume can be placed on a specific portion of the grasped object when desired for a specific grasping purpose, such as enclosing or as close as possible to the object's mass center for a pick-and-place purpose. This intersected volume can ensure that a number of grasp contacts can be made between the object and the robotic fingers when closed. Maximized intersected volume can be used when it is desired to wrap robotic fingers around the object as much as possible. This intersected volume between the object and the grasper is placed such that the grasper will not collide with other elements in its environment such as tables or walls or other objects nearby.

As also provided, above, the very-high efficiency for the grasp planning algorithm is due at least in part to the described algorithm and related techniques such as employing the volume models of the grasping device, determining a specific pre-grasp pose and its volume for a specific approach direction, and finding the intersected volume between an object and the grasper volume that is within free space. This technology transforms a difficult problem of planning a desirable grasp based on the extremely large number of possible hand approach, position and pre-grasp poses to a simple problem of intersecting two volumes at a desirable portion of an object such that it is free from other environment constraints.

The grasping-device data can include the number of members, number of links of each member, number of joints of each member, degrees of freedom (DOFs) associated with the hand and each member, size of the links, ranges of motion (e.g., maximum and minimum angles achievable by the links or angles), etc.

The object data can include object size, mass, weight, center of mass, position, pose, grasp requirements, such as a requirement that a trigger be grasped (see e.g., FIGS. 18 and 19), etc.

The grasp volume can be modeled in any of a wide variety of manners. In some embodiments, the grasp volume is modeled as a certain pre-determined three-dimensional shape, or one of a plurality of pre-determined three-dimensional shapes.

Example models for use in planning the approach and position include a sphere, a cylinder, and a convex hull. In one embodiment, the latter corresponds to a general shape formed by the members (e.g., fingers) of the grasping device being in a pre-set pose (e.g., a slight, intermediate, or large pose) of the grasping device and their inward sweep if the fingers are not already swept in.

For example, the convex hull model for a three-member device would have a height, or thickness, extending between three corners, or vertices. A convex hull model for five-member device would have a height or thickness extending between five corners, or vertices. Example hulls for a three-finger grasping device are shown, and described above in connection with, FIGS. 7, 8, and 9.

Example grasp models are shown in the figures: spherical models in FIG. 4; cylindrical models in FIGS. 5 and 6; stacked cylindrical volume models in FIGS. 24 and 25, and convex hull models in FIGS. 7-9.

Each model is selected by the computer processor, executing the computer-readable code described below, with consideration given to the size, shape, and/or pose of the object to be grasped. In one embodiment, the resulting model size will correspond generally to a pose of the hand that corresponds to a general size or volume of the grasp of the device.

In some embodiments, it is preferred or required that the model, or at least a relevant portion of the model, generated or selected be at least slightly larger than an approached-area of the object. This greater-than requirement allows the model, and so the grasping device striking a resulting pose from the planned approach, to contact the object as needed, such as by partially enveloping, hooking, and/or pinching the object between two or more members of the grasping device.

A vertical or horizontal cylinder model may be selected according to a direction of the major axis of the object. For example, if the major axis is generally along an approach direction, a vertical cylindrical volume model can be used. In other cases, e.g., where the minor axis of the object is along the approach direction, a horizontal cylindrical volume model can be used.

Consider, e.g., a generally top-down grasp of the object in FIG. 11, as posed, the generally top-down grasp of FIG. 16, the side or end grasp shown in FIG. 20, and the small or pinch item of FIG. 17, each of which may correspond to different cylinder model for the grasping device 300.

These scenarios could also be accommodated by another model, such as a sphere, hull, or other, and the algorithm will control which the computer processor generates or selects under the circumstances. The size of the model, cylinder, sphere, or other, depends on the size of the target grasp area of the object.

A convex hull model is generally used to navigate through environments see graphs that show the modification of approach vector.

The model can also be based in part on a type of grasp determined needed for the situation. Grasp types include, for example, precision grasps, power grasps, and hook or wrap-around grasps. The positioning of the grasping device, and also initial posing of the device, can facilitate a particular type of needed or desired grasp, such as a precision, power, or hook grasp.

The type of grasp needed or desired can be indicated in the input data, described above, and or determined by the processor. The grasp data can be part of the object data, or the constraint data as a constraint. In a contemplated embodiment, the grasp data is separate from the object and constraint data, and can be obtained in connection with its own operation block (not shown) of FIG. 3.

A power grasp is focused on obtaining a robust handle of the device, limiting the chance of the object moving in the grasp. Power grasps are preferred for applications such as the pick-and-place act described above.

For power grasps, it is generally preferred to grasp the object at or near the object center of mass (C-O-M, or COM). Environmental constraints may limit the ability for COM grasping, such as shown in, and described above in connection with, FIG. 16.

Benefits of grasping an object close to its COM include the need for less squeezing, or energy, to hold the object reliably. This benefit results from a minimizing of moments, or angular forces, that the grasping device need counter in moving the object.

While the present technology is useful for planning an approach toward any of various preferred grasp types, planning an approach toward a power grasp is described mostly herein. The description is provided in this way in part because it is estimated that power grasps will be the most common grasp type used in application of the present technology.

A precision grasp is helpful when, e.g., it is required that an object be oriented carefully after being grasped, such as placement of a key into a keyhole. A precision grasp is also helpful for scenarios in which the object is to be manipulated during the grasp such as if the grasping device, or another grasping device, or person, would need to press a button (e.g., phone or calculator button) of the object after it is lifted by the device. An overall size of the object is one factor for precision grasp, and the environment constraint is another factor for selecting a model for performing a precision grasp, such as one shown in FIG. 17.

A hook grasp involves grasps in which one or more members of the hand are to wrap all the way or significantly around an object. Distinguish, e.g., a grasp that may hold the object between finger-tip areas of the grasping device members, as provided herein in connection with, e.g., FIG. 17, which can be considered a precision grasp, as provided.

Hook, or wrap-around, grasps can be performed on objects extending substantially horizontally if the member(s) can get beneath the object so as to hook it. An example of this situation is provided herein in connection with FIGS. 18 and 19. Hook grasps can be performed on object extending upward, such as provided in connection with FIG. 15, barring obstructing constraints, such as tall walls blocking a needed approach for the hook grasp.

In some embodiments, variables affecting selection of a grasp type include an available or preferred amount of energy or force output by the device. As described, a grasping device generally needs to use less energy to hold reliably an object when grasping the object at or near the COM. Thus, a power grasp may be preferred or required because using little or less energy is preferred or required, such as based on a maximum force generation possible or preferred for the device.

It should be appreciated that some scenarios call for more than one type of grasp.

In connection with the scenario shown in FIGS. 18 and 19, for instance, it may be that power and precision grasp characteristics are needed. It may be required that the grasping device robustly grasp a handle of the object (a hand-held power drill, for example), for secure lifting and moving the object, and also required that the grasping device carefully position one of its members over the actuation button of the object for select activation of the object.

Also in connection with the scenario shown in FIGS. 18 and 19, and perhaps FIG. 15 (e.g., if the object 1200 is relatively heavy, slippery, or otherwise not extremely easy to hold), for instance, it may be that power and hook grasp characteristics are needed. It may be required that the grasping device robustly grasp a handle of the object (a hand-held power drill, for example), for secure lifting and moving the object, and that hooking the device, or wrapping one or more device members around a portion of the object is to best or preferred way to do so.

A grasp involving some or all of the characteristics of multiple other grasps can be referred to as a combination of the other grasps or by its own name. A grasp involving features of a power grasp and a precision grasp can be referred to as a power-precision grasp, a precision-power grasp, a controlled grasp, a controlled-power grasp, the like, or other.

With continued reference to FIG. 22, from block 2204, flow of the algorithm proceeds to block 2206. At block 2206, the processor determines all environmental constraints. Information describing all or some of the constraints can be obtained as part of the constraint data described above in connection with the method 2100 of FIG. 21. And the obtaining can include receiving and/or generating the constraint data.

An example of generating constraint data includes sensing or defining one or more constraints, such as surfaces, adjacent the object that must be avoided for executing the approach and subsequent grasping of the object. The sensing can be performed using cameras, for instance.

As provided, the constraints can include a surface supporting the object, sides or walls adjacent the object, and other nearby objects, just to name a few.

From block 2206, flow of the algorithm proceeds to block 2208, whereat the processor modifies the initial, or test, approach determined at operation 2202. In this approach, it is assumed that some modification is needed, even if modification needed is extremely slight, to optimize the resulting approach. If, in the operation, the processor determines that a modification is not needed, or is near nil—i.e., the initial approach happened to be perfect or nearly so, despite any affecting constraints—then the initial or test approach is not modified at operation 2208.

In one contemplated embodiment, the processor at block 2208 does not assume that the initial approach needs modifying, and rather includes an act or determining whether the initial, or test, approach determined at block 2202 should be modified. If the initial approach should be modified, the operation 2208, or a subsequent operation (not called out expressly by a block in FIG. 22), includes modifying the initial approach as needed.

Modifying the initial approach, and/or determining whether modification is needed, in one embodiment includes considering a net direction of all limitations affecting object approach and for which data has been obtained.

The modifying function, and/or determining whether modification is needed, can include comparing the approach to all such limitations, such as to identify non-feasible motions, or motion vectors, or more or less-preferred motions, or motion vectors, of the approach.

The limitations include any environmental constraints, such as adjacent surfaces, adjacent objects (or adjacent objects can be a non-environmental constraint, or non-constraint limitations), required grasp type(s) (e.g., power, precision, hook), required grasp details, such as positioning a member over an actuating button of the object, and any other limitation, for which data has been obtained, that may affect an eventual approach and/or subsequent desired grasp.

With continued reference to FIG. 22, from block 2208, flow of the algorithm proceeds to block 2210. At block 2210, the processor determines a virtual floor, or bottom limit, below which the grasping device and grasp cannot go. The virtual floor will determine the position of the grasper along the approach direction, or vector.

In a contemplated embodiment, the virtual floor is considered an environmental constraint. In one embodiment, consideration of the virtual floor (e.g., step 2210) is part of the operation(s) described regarding the previous step(s) 2208.

The virtual floor can, but need not in every case, correspond to a level of a surface on which the object rests. For instance, if it is desired, preferable, or required according to the algorithm that the grasping device grasp only a top of an object (reference, e.g., FIG. 16), the virtual floor would be above the surface on which the object sits. In the scenario of FIG. 16, the virtual floor could correspond to about two (2) units on the illustrated vertical axis 310.

In addition to, or in combination with considering a supporting surface in determining a virtual floor, in a contemplated embodiment the processor also considers the effects of surfaces and objects adjacent the object, and how they limit the ability of the grasping device to go closer to the object along the approach direction. For instance, tall walls can dictate or affect determination of the virtual floor, as may also be the case in connection with the scenario of FIG. 16.

In some embodiments, determining the virtual floor includes performing an intersection analysis, or sub-process. Generally, the intersection analysis includes using the grasp model, determined at operation 2204, and a portion of the object. The intersection analysis includes determining a preferred intersection of the selected grasp volume model and the actual object volume.

More particularly, a relationship between the model and object volumes, or a preference for a type of the intersection sought in the intersection analysis, can depend on the task at hand.

For example, if the task is a type requiring a relatively-high force, such as to pick and place an object as described above, and especially for relatively-heavier objects, or to squeeze an object, then a power type of grasp is appropriate. For a power grasp, the grasping device, e.g., palm thereof, should generally be closer to the object to allow a more robust grasp if environment allows such a placement.

More particularly, in some embodiments, in addition to being close to the object, for power type grasps, the intersection preferably includes aligning a virtual center of the grasp volume model as close as possible to the center of mass (COM) of the object.

A result of such power-grasps, along with the other results described herein, is a higher likelihood of increased hand-to-object contact, rendering the grasp more robust and reliable. Another result, is that less force, which equates to energy input, is needed to hold the object when it is grasped at or closer to its COM. This relates to the physics of handling the object, including there being less moments, or angular forces, to handle when the object is handled closer to the COM.

If on the other hand the object should be picked up carefully, or the object will need to be manipulated post-grasp, such as for the key-to-keyhole, phone, or calculator, examples described above, then it may be better for the hand (e.g., palm) to be distanced more from the object. For these types of grasps, aligning a center of the virtual grasp model with the COM of the object would not be a controlling goal. Rather, the intersection can have the center of the model spaced slightly or markedly away from the COM.

In some implementations, the particular intersection resulting from this type of analysis will be dictated mostly by variables, other than any interest in aligning the model center with the object COM, such as what areas on the object it is preferred that the grasping-device members contact or do not contact, what pose will cause the object to be shaken the least in the grasping and/or moving (e.g., for very-fragile objects), what portion of the grasping device (e.g., finger tips) it is preferred to contact the object with, similar considerations, or other considerations.

Further regarding precision types of grasps, it will also be appreciated that a less-close grasp generally exposes more surface of the object during the grasp. Doing so can, e.g., better expose buttons of an object, such as a calculator or phone, that another grasping device or human may need to manipulate post grasp.

For hook grasping, the intersection analysis includes positioning the one or more members to performing the hook as close to the grasp or hook area of the object as possible. This area is also usually at or close to the COM of the object considering mass and force distributions involved with grasping picking up, and balancing the object in the hook.

As provided, FIGS. 26-29 illustrate visualizations of example intersection analyses, the algorithm automatically performs to select the best feasible grasp approach and position of the grasping device in real-time, involving virtual grasp volumes overlapping or intersecting with virtual representations of the subject objects under various environmental constraints, according to embodiments of the present technology. FIG. 26 shows a virtual complex-hull model 2600 that has approached an object 1200 lying on a surface 1100 e.g., table top. As can be seen in FIG. 26, the approach could be generally downward along a minor axis of the object 1200 (reference, e.g., minor axis 1216 addressed in connection with FIGS. 12 and 13, which is in some cases generally orthogonal to the major axis 1214 addressed in connection with the same figures). FIG. 27 shows a virtual complex-hull model 2700 that has approached the object 1200 here standing in a relatively-tall box 1600[1] (the box can be like the box described above in connection with FIG. 16, and is referenced here with a superscript to acknowledge that the dimensions are slightly different than those in the box of FIG. 16). As with the scenario of FIG. 26, the approach in the scenario of FIG. 27 can be generally downward; in the case of FIG. 27, though, due to the box constraint 1600[1], the approach is along the major axis of the object 1200 (reference, e.g., major axis 1214 of FIGS. 12 and 13). FIG. 28 shows a virtual complex-hull model 2800 that has approached the object 1200 here standing in a corner of multiple surfaces. In this case, the approach cannot cause the grasping volume to come directly from the top because of a side wall portion of the corner. A successful approach and volume pose can lie on some amount diagonal, such as the example diagonal volume pose shown in FIG. 28. FIG. 29 shows a virtual complex-hull model 2900 that has approached an object 1801 lying in a relatively-shallow box 2902.

In some situations, the processor will have trouble determining a proper intersection, such as if a part is too far in a corner, and sized and shaped, so that the robotic hand cannot readily grasp it. For such situations, it is contemplated that the algorithm can include remedying functions. An example remedying function includes causing the grasping device to manipulate the object, such as by touching or nudging the object away from a corner. Another example remedying function includes causing the grasping device to manipulate a supporting structure, such as a box holding the object, to move the object to a better position and/or pose for being grasped. After the remedying function, the processes 2100, 2200, or at least the operations that are affected by the object or constraint repositioning, are repeated.

From block 2210, flow of the algorithm proceeds to block 2212, whereat the processor determines a final grasping-device position and pose, which can be referred to as a final hand position and pose. In one embodiment, the determination of block 2212 includes considering result of operations 2210 and 2208.

The final hand position and pose is determined so that the grasp subsequently planned and performed will be within known requirements, such as staying above the virtual floor and avoiding active constraints. The final hand position and pose is determined so that the grasp subsequently planned and performed can be executed as required preferred, or desired, such as to perform a power, precision, hook, or combination grasp or post-grasp manipulation of the object.

In one embodiment, achieving the final hand position and pose can be effected in part by micro or macro movements of a wrist, such as that 106 shown in FIG. 1, and/or one or more higher joints (not shown), such as an elbow. In some embodiments, the wrist 106 is considered a part of the grasping device, and in some embodiments considered separate and connected to the grasping device. The same applies to any higher joint(s), e.g., elbow(s).

Determining the final hand pose can include positioning the members of the grasping device. The members can be posed to correspond generally to the grasping model determined in operation 2204.

At termination pentagon 2214, the grasp approach, position, and pre-grasp pose planned are packaged and/or otherwise processed for being transmitting to a destination for implementation. The destination can include a processor that is to generate a planned grasp, using the approach, position, and pre-grasp pose data.

The destination processor is in some embodiments the same as, and in other embodiments different than, the processor that planned the approach, position, and pre-grasp pose.

If the destination processor is the same processor, a message does not necessarily need to be transmitted, and the processor simply uses the planned approach, position, and pre-grasp pose information in planning a grasp.

The process 2200 can end, or be repeated, such as in connection with a next object.

XIX. Determining Grasping-Device Pose

As referenced above, the resulting approach data indicates an initial position of the grasping device 100 adjacent the object. The position or pose can be referred to as a final position and pose, considering a perspective of the approach planning an implementation, or as an initial position and pose, considering a perspective of the subsequent grasp planning an implementation, because it is a starting point from which a grasp motion is to be performed.

The approach information indicates, directly or indirectly, the final position and pose of the grasping device in six-dimensional space. The approach data can, e.g., indicate the position in terms of three linear dimensions (e.g., X, Y, Z) and indicate pose of the grasping device in terms of three angular or rotational dimensions.

In one embodiment, the approach data indicates a position of a palm portion of the grasping device 100. The palm portion is analogous to the human palm, being located adjacent and connected to a base of the finger(s). The palm of the grasping device 100 illustrated in FIG. 1 is represented by numeral 162, and as 308 in FIG. 3.

The approach planned can be embodied as one or more messages, and/or approach data, for consideration by the same or different computer system in planning a grasp, the grasp including required, preferred, or optimal finger poses for grasping the object approached according to the planned approach.

XX. Computing System—FIG. 23

FIG. 23 illustrates an example computer system 2302 for use in performing the operations of the present technology. The system 2302, or parts thereof, can be a stand-alone computer or a single board computer embedded and connected to the gripper motion controller The system 2302 includes a memory, or computer-readable medium 2304, such as volatile medium, non-volatile medium, removable medium, and non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computing system 2302 also includes a computer processor 2306 connected or connectable to the computer-readable medium 2304 by way of a communication link 2308, such as a computer bus.

The computer-readable medium 2304 includes computer-executable instructions 2310. The computer-executable instructions 2310 are executable by the computer processor 2306 to cause the processor, and thus the computing system 2302, to perform all or any combination of the functions described in the present disclosure, including those described above in connection with FIGS. 21 and 22.

The computer-executable instructions 2310 can be arranged in one or more software modules. The modules can be referred to by the operations or operations that they cause the computer processor 2306 to perform. For instance, a module including instructions that, when executed by the processor 2306, cause the processor to perform an operation of generating a test or initial approach can be referred to as an initial-approach module, a test-approach-generation module, or the like.

Similarly, a module causing the computer processor to perform an operation of determining, e.g., generating or selecting, a grasp model, can be referred to as a model-generating module, a model-determining module, or the like.

The term software module, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The computer processor 2306 is also connected or connectable to at least one interface 2312 for facilitating communications, between the computer system 2302 and local components 2314, and between the computing system 2302 and remote 2316. The components 2314 can include databases, servers, other processors, other storage mediums, and/or other computing devices. The interface can include a transmitter, receiver, or transmitter that is wired and/or wireless-based for supporting wired and/or wireless protocol communications, respectively.

Although shown as being a part of the computer system 2302, completely, the interface 2312, or any aspect(s) thereof, is partially or completely a part of the system 2302. The interface 2312, or any aspect(s) thereof, can be partially or completely external to and connected or connectable to the computing system 2302. For communicating with the remote components 2316, the interface 2312 includes one or both of a short-range transceiver and a long-range transceiver.

XXI. Conclusion

The technology described herein has benefits including facilitating grasping of a complex object using a robotic grasping device in real-time. Functions include planning a grasp approach, position, and pre-grasp pose for implementation by the device, based on input data including object data, grasping-device data, and environmental-constraint data.

The planned approach, position, and pre-grasp pose allow significantly more feasible and robust grasping as compared to conventional systems that approach objects according to manual directing by a human operator or based simply on feedback from vision systems and/or touch sensors.

Also, conventional methods attempting to approach an object based on vision and/or touch sensors, or collision checking, is computationally expensive, and time consuming.

The present technology provides a fast computation for reliably approaching an object for feasible and robust grasping thereof. The benefits are achievable based in part upon a function of characterizing, the grasping device as a volume model, such as a model sphere, cylinder, or convex hull.

The benefits can also be achieved by determining an initial, or test approach, testing the feasibility thereof, and modifying the approach as needed. The initial approach in some cases includes approaching the object at a vector generally along a minor axis, perpendicular to a major axis, and through a center of mass (COM) of the object.

The benefits can also be achieved by determining, based on the volume model and modified approach, a virtual floor for the robotic hand making the subsequent grasp.

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. A system, comprising:
   a processor; and
   a non-transitory computer-readable medium comprising instructions that, when executed by the processor, cause the processor to perform operations, for planning a grasping-device approach to an object by a grasping device, a pre-grasp device position, and a pre-grasp device pose, comprising:
      obtaining input data including grasping-device data, object data, and environmental-constraint data;
      determining, based on at least the grasping-device data, a grasp volume model;
      determining a test approach vector;
      determining, using the test approach vector, the environmental-constraint data, and the grasp volume model, whether modification to the test approach vector is needed;
      modifying, if it is determined that the modification is needed, the test approach vector, yielding a resulting approach vector;
      determining, if it is determined that the modification is not needed, that the test approach vector is the resulting approach vector;
      determining virtual floor data indicating a position below which the grasping device cannot move; and
      determining, based on the resulting approach vector, the virtual floor data, the grasp volume model, and the object data, the grasping-device approach, the pre-grasp device position, and the pre-grasp device pose.

2. The system of claim 1, wherein the operation of determining the grasp-volume model is based at least in part on the grasping-device data.

3. The system of claim 1, wherein the operation of determining the grasp-volume model includes selecting the grasp-volume model from a plurality of pre-determined candidate models.

4. The system of claim 1, wherein the operation of determining the grasp-volume model is based at least in part on the object data.

5. The system of claim 1, wherein the grasp-volume model determined is one of a group consisting of a spherical grasp-volume model, a cylindrical grasp-volume model, and a convex-hull grasp-volume model.

6. The system of claim 1, wherein the operation of determining the grasp-volume model includes determining a type of grasp to be used.

7. The system of claim 6, wherein the type of grasp is selected from a group consisting of a precision grasp, a power grasp, a hook grasp, and some combination of the precision grasp, the power grasp, and the hook grasp.

8. The system of claim 6, wherein the type of grasp is indicated in the object data or the environmental-constrain data.

9. The system of claim 1, wherein the operation of determining the grasp-volume model is based on at least one variable selected from a group consisting of:
   an available amount of output energy of the device;
   an available amount of output force of the device;
   a preferred amount of output energy of the device to be used; and
   a preferred amount of output force to be exerted by the device.

10. The system of claim 1, wherein the operation of obtaining the grasping-device data comprises generating at least part of the grasping-device data.

11. The system of claim 1, wherein the environmental-constraint data includes a contact requirement related to the object, and the contract requirement relates to a trigger associated with the object.

12. The system of claim 1, wherein the operation of obtaining the grasping-device data comprises receiving the grasping-device data from a storage device associated with the grasping device.

13. The system of claim 1, wherein the operation of determining the test approach vector is performed using at least one characteristic selected from a group consisting of:
   a center of mass of the object;
   a major axis of the object; and
   a minor axis of the object.

14. The system of claim 1, wherein the operation of determining the test approach vector is performed using the environmental-constraint data.

15. The system of claim 1, wherein the operation of modifying the test approach vector comprises using a net direction of all limitations, for which data has been obtained, affecting object approach.

16. The system of claim 1, wherein the operation of modifying the test approach vector comprises processing data indicating at least one motion selected from a group consisting of:
   an unfeasible motion;
   a more-preferred motion; and
   a less-preferred motion.

17. The system of claim 1, the operation of determining the virtual floor comprises performing an intersection analysis including determining a preferred intersection of the grasp volume model and a volume of the object.

18. The system of claim 1, wherein:
   the environmental-constraint data includes the virtual floor data; and
   the operation of determining whether modification to the test approach vector is needed is based also on the virtual floor data.

19. A method, for planning a grasping-device approach to an object by a grasping device, a pre-grasp device position, and a pre-grasp device pose, comprising:
   obtaining, by a system using a processor, input data including grasping-device data, object data, and environmental-constraint data;
   determining, based on at least the grasping-device data, a grasp volume model;
   determining, by the system, a test approach vector;
   determining, by the system, using the test approach vector, the environmental-constraint data, and the grasp volume model, whether modification to the test approach vector is needed;
   modifying, by the system, if it is determined that the modification is needed, the test approach vector, yielding a resulting approach vector;
   determining, by the system, if it is determined that the modification is not needed, that the test approach vector is the resulting approach vector;
   determining, by the system, virtual floor data indicating a position below which the grasping device cannot move; and
   determining, by the system, based on the resulting approach vector, the virtual floor data, the grasp volume model, and the object data, the grasping-device approach, the pre-grasp device position, and the pre-grasp device pose.

20. A non-transitory computer-readable storage device comprising computer-executable instructions that, when executed by the processor, cause a processor to perform operations, for planning a grasping-device approach to an object by a grasping device, a pre-grasp device position, and a pre-grasp device pose, comprising:

obtaining input data including grasping-device data, object data, and environmental-constraint data;

determining, based on at least the grasping-device data, a grasp volume model;

determining a test approach vector;

determining, using the test approach vector, the environmental-constraint data, and the grasp volume model, whether modification to the test approach vector is needed;

modifying, if it is determined that the modification is needed, the test approach vector, yielding a resulting approach vector;

determining, if it is determined that the modification is not needed, that the test approach vector is the resulting approach vector;

determining virtual floor data indicating a position below which the grasping device cannot move; and determining, based on the resulting approach vector, the virtual floor data, the grasp volume model, and the object data, the grasping-device approach, the pre-grasp device position, and the pre-grasp device pose.

\* \* \* \* \*